(12) United States Patent
Aleksic et al.

(10) Patent No.: US 8,554,559 B1
(45) Date of Patent: Oct. 8, 2013

(54) LOCALIZED SPEECH RECOGNITION WITH OFFLOAD

(71) Applicant: Google Inc., Mountain View, CA (US)

(72) Inventors: Petar Aleksic, Mountain View, CA (US); Xin Lei, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/746,115

(22) Filed: Jan. 21, 2013

Related U.S. Application Data

(60) Provisional application No. 61/671,310, filed on Jul. 13, 2012.

(51) Int. Cl.
*G10L 15/00* (2013.01)
(52) U.S. Cl.
USPC .......................... 704/235; 704/257; 704/275
(58) Field of Classification Search
USPC .................................. 704/235, 257, 275
See application file for complete search history.

(56) References Cited

U.S. PATENT DOCUMENTS

| | | |
|---|---|---|
| 4,741,036 A | 4/1988 | Bahl et al. |
| 4,956,865 A | 9/1990 | Lennig et al. |
| 5,086,385 A | 2/1992 | Launey et al. |
| 5,233,681 A | 8/1993 | Bahl et al. |
| 5,257,314 A | 10/1993 | Kimura et al. |
| 5,278,942 A | 1/1994 | Bahl et al. |
| 5,428,707 A | 6/1995 | Gould et al. |
| 5,606,644 A | 2/1997 | Chou et al. |
| 5,625,748 A | 4/1997 | McDonough et al. |
| 5,675,704 A | 10/1997 | Juang et al. |
| 5,799,276 A | 8/1998 | Komissarchik et al. |
| 5,864,810 A | 1/1999 | Digalakis et al. |
| 5,895,447 A | 4/1999 | Ittycheriah et al. |
| 6,052,682 A | 4/2000 | Miller et al. |
| 6,064,959 A | 5/2000 | Young et al. |
| 6,073,097 A | 6/2000 | Gould et al. |
| 6,085,160 A | 7/2000 | D'Hoore et al. |
| 6,112,175 A | 8/2000 | Chengalvarayan |
| 6,138,095 A | 10/2000 | Gupta et al. |
| 6,151,575 A | 11/2000 | Newman et al. |
| 6,167,377 A | 12/2000 | Gillick et al. |
| 6,185,531 B1 | 2/2001 | Schwartz et al. |
| 6,223,159 B1 | 4/2001 | Ishii |

(Continued)

OTHER PUBLICATIONS

Allauzen, Cyril et al., "OpenFst: A General and Efficient Weighted Finite-State Transducer Library." In Proceedings of the 12th international conference on Implementation and application of automata, 2007, pp. 11-23. Springer-Verlag.

(Continued)

*Primary Examiner* — Vincent P Harper
(74) *Attorney, Agent, or Firm* — McDonnell Boehnen Hulbert & Berghoff LLP

(57) ABSTRACT

A local computing device may receive an utterance from a user device. In response to receiving the utterance, the local computing device may obtain a text string transcription of the utterance, and determine a response mode for the utterance. If the response mode is a text-based mode, the local computing device may provide the text string transcription to a target device. If the response mode is a non-text-based mode, the local computing device may convert the text string transcription into one or more commands from a command set supported by the target device, and provide the one or more commands to the target device.

14 Claims, 13 Drawing Sheets

(56) References Cited

U.S. PATENT DOCUMENTS

| | | | |
|---|---|---|---|
| 6,224,636 B1 | 5/2001 | Wegmann et al. | |
| 6,236,963 B1 | 5/2001 | Naito et al. | |
| 6,243,679 B1 | 6/2001 | Mohri et al. | |
| 6,253,181 B1 | 6/2001 | Junqua | |
| 6,332,122 B1 | 12/2001 | Ortega et al. | |
| 6,334,102 B1 | 12/2001 | Lewis et al. | |
| 6,408,272 B1* | 6/2002 | White et al. | 704/270.1 |
| 6,418,411 B1 | 7/2002 | Gong | |
| 6,456,975 B1 | 9/2002 | Chang | |
| 6,470,314 B1 | 10/2002 | Dharanipragada et al. | |
| 6,519,562 B1 | 2/2003 | Phillips et al. | |
| 6,567,776 B1 | 5/2003 | Chang et al. | |
| 6,804,647 B1 | 10/2004 | Heck et al. | |
| 6,865,528 B1 | 3/2005 | Huang et al. | |
| 6,901,364 B2 | 5/2005 | Nguyen et al. | |
| 6,915,259 B2 | 7/2005 | Rigazio et al. | |
| 6,941,264 B2 | 9/2005 | Konopka et al. | |
| 6,999,926 B2 | 2/2006 | Yuk et al. | |
| 7,062,436 B1 | 6/2006 | Odell et al. | |
| 7,076,428 B2 | 7/2006 | Anastasakos et al. | |
| 7,092,888 B1 | 8/2006 | McCarthy et al. | |
| 7,269,555 B2 | 9/2007 | Yuk et al. | |
| 7,328,154 B2 | 2/2008 | Mutel et al. | |
| 7,337,115 B2 | 2/2008 | Liu et al. | |
| 7,418,386 B2 | 8/2008 | Lai et al. | |
| 7,437,296 B2 | 10/2008 | Inoue et al. | |
| 7,499,857 B2 | 3/2009 | Gunawardana | |
| 7,584,102 B2 | 9/2009 | Hwang et al. | |
| 7,668,718 B2 | 2/2010 | Kahn et al. | |
| 7,680,659 B2 | 3/2010 | Gao et al. | |
| 7,725,316 B2 | 5/2010 | Chengalvarayan et al. | |
| 7,729,909 B2 | 6/2010 | Rigazio et al. | |
| 7,756,708 B2 | 7/2010 | Cohen et al. | |
| 7,822,603 B1 | 10/2010 | Parthasarathy et al. | |
| 7,822,605 B2 | 10/2010 | Zigel et al. | |
| 7,912,447 B2 | 3/2011 | Bennett, III et al. | |
| 8,014,591 B2 | 9/2011 | Baker | |
| 8,032,537 B2 | 10/2011 | Consul et al. | |
| 8,050,908 B2 | 11/2011 | Mohri et al. | |
| 8,082,147 B2 | 12/2011 | Parthasarathy et al. | |
| 8,095,356 B2 | 1/2012 | Kempe et al. | |
| 8,260,615 B1 | 9/2012 | Nakajima et al. | |
| 8,296,138 B2 | 10/2012 | Parthasarathy et al. | |
| 8,306,819 B2 | 11/2012 | Liu et al. | |
| 8,346,551 B2 | 1/2013 | Herbig et al. | |
| 2002/0049600 A1 | 4/2002 | L'Esperance et al. | |
| 2002/0055844 A1 | 5/2002 | L'Esperance et al. | |
| 2002/0069063 A1* | 6/2002 | Buchner et al. | 704/270 |
| 2002/0087987 A1 | 7/2002 | Dudkiewicz et al. | |
| 2002/0123891 A1 | 9/2002 | Epstein | |
| 2003/0050780 A1 | 3/2003 | Rigazio et al. | |
| 2004/0088162 A1 | 5/2004 | He et al. | |
| 2004/0093210 A1 | 5/2004 | Toyama | |
| 2004/0107099 A1 | 6/2004 | Charlet | |
| 2004/0230424 A1 | 11/2004 | Gunawardana | |
| 2004/0249628 A1 | 12/2004 | Chelba et al. | |
| 2005/0028208 A1 | 2/2005 | Ellis et al. | |
| 2005/0044053 A1 | 2/2005 | Moreno et al. | |
| 2005/0131688 A1 | 6/2005 | Goronzy et al. | |
| 2006/0009972 A1 | 1/2006 | Yuk et al. | |
| 2006/0074664 A1 | 4/2006 | Lam et al. | |
| 2006/0132326 A1 | 6/2006 | Fang et al. | |
| 2007/0005355 A1 | 1/2007 | Tian et al. | |
| 2007/0129943 A1 | 6/2007 | Lei et al. | |
| 2008/0010057 A1* | 1/2008 | Chengalvarayan et al. | 704/9 |
| 2008/0091423 A1 | 4/2008 | Roy et al. | |
| 2008/0120112 A1 | 5/2008 | Jordan et al. | |
| 2008/0177545 A1 | 7/2008 | Li et al. | |
| 2008/0195389 A1 | 8/2008 | Zhang et al. | |
| 2008/0215311 A1 | 9/2008 | Chelba et al. | |
| 2008/0270449 A1 | 10/2008 | Gossweiler et al. | |
| 2008/0312926 A1 | 12/2008 | Vair et al. | |
| 2009/0024390 A1 | 1/2009 | Deshmukh et al. | |
| 2009/0063483 A1 | 3/2009 | Chen et al. | |
| 2009/0112592 A1 | 4/2009 | Candelore | |
| 2010/0057453 A1 | 3/2010 | Valsan | |
| 2010/0076765 A1 | 3/2010 | Zweig et al. | |
| 2010/0114572 A1 | 5/2010 | Tani et al. | |
| 2010/0138222 A1 | 6/2010 | Herbig et al. | |
| 2010/0169094 A1 | 7/2010 | Akamine et al. | |
| 2010/0228548 A1 | 9/2010 | Liu et al. | |
| 2010/0296654 A1 | 11/2010 | Wilson et al. | |
| 2010/0312557 A1 | 12/2010 | Strom et al. | |
| 2010/0332235 A1 | 12/2010 | David | |
| 2011/0029307 A1 | 2/2011 | Parthasarathy et al. | |
| 2011/0054895 A1 | 3/2011 | Phillips et al. | |
| 2011/0055256 A1 | 3/2011 | Phillips et al. | |
| 2011/0067059 A1 | 3/2011 | Johnston et al. | |
| 2011/0131045 A1* | 6/2011 | Cristo et al. | 704/249 |
| 2011/0134320 A1 | 6/2011 | Daly | |
| 2011/0213613 A1 | 9/2011 | Cohen et al. | |
| 2011/0313775 A1 | 12/2011 | Laligand et al. | |
| 2012/0078621 A1 | 3/2012 | Kanevsky et al. | |
| 2012/0109651 A1 | 5/2012 | Chen | |
| 2012/0150539 A1 | 6/2012 | Jeon et al. | |
| 2012/0278073 A1* | 11/2012 | Weider et al. | 704/235 |
| 2012/0330661 A1* | 12/2012 | Lindahl | 704/235 |
| 2013/0090924 A1* | 4/2013 | Rothschild | 704/235 |

OTHER PUBLICATIONS

Allauzen, Cyril et al., "OpenFst: A General and Efficient Weighted Finite-State Transducer Library," http://www.stringology.org/event/CIAA2007/pres/Tue2/Riley.pdf, Jul. 17, 2007, pp. 1-36.

Bahl et al., "A Maximum Likelihood Approach to Continuous Speech Recognition," IEEE Transactions on Pattern Analysis and Machine Intelligence, Mar. 1983, pp. 179-190, vol. PAMI-5, No. 2.

Fong et al., "Detecting Word Substitutions in Text," IEEE Transactions on Knowledge and Data Engineering, Aug. 2008, vol. 20, No. 8, pp. 1067-1076.

Fontanari, Jose F., "Minimal models for text production and Zipf's law," Integration of Knowledge Intensive Multi-Agent Systems, KIMAS 2005, pp. 297-300.

Goel et al., "Minimum Bayes-Risk Automatic Speech Recognition." Computer Speech & Language, 2000, pp. 115-135, vol. 14, No. 2.

Joachims et al., "SVMstruct-Support Vector Machine for Complex Outputs," Cornell University, Department of Computer Science, Aug. 14, 2008, pp. 1-6.

Ljolje et al. "Efficient general lattice generation and rescoring." Sixth European Conference on Speech Communication and Technology, 1999, pp. 1-4.

Mangu et al., "Finding consensus in speech recognition: word error minimization and other applications of confusion networks," Computer Speech & Language, 2000, pp. 373-400, vol. 14, No. 4.

Mohri et al., "The Design Principles of a Weighted Finite-State Transducer Library," Theoretical Computer Science, 2000, pp. 17-32, vol. 231, No. 1.

Mohri et al., "Weighted Finite-State Transducers in Speech Recognition," Computer Speech & Language, 2002, pp. 69-88, vol. 16, No. 1.

Mohri, Mehryar. "Weighted Finite-State Transducer Algorithms. An Overview." Studies in Fuzziness and Soft Computing, 2004, pp. 551-564, vol. 148.

Mohri, M., "Edit-Distance of Weighted Automata: General Definitions and Algorithms," International Journal of Foundations of Computer Science, 2003, pp. 957-982, vol. 14, No. 6.

Mohri et al., "A Rational Design for a Weighted Finite-State Transducer Library." Automata Implementation, 1998, pp. 144-158.

OpenFst Examples, http://www.openfst.org/twiki/bin/view/FST/FstExamples, pp. 1-9.

Post et al., "Weight pushing and binarization for fixed-grammar parsing," In Proceedings of the 11th International Conference on Parsing Technologies Association for Computational Linguistics, 2009, pp. 89-98.

Schulter, R. et al., "Bayes Risk Minimization Using Metric Loss Functions," In Proceedings of the European Conference on Speech Communication and Technology, Interspeech, 2005, pp. 1449-1452.

Stolcke, Andreas et al., "Explicit word error minimization in N-best list rescoring." In Proc. Eurospeech, 1997, pp. 163-166, vol. 1.

(56) References Cited

OTHER PUBLICATIONS

Tsochantaridis et al., "Large Margin Methods for Structured and Interdependent Output Variables," Journal of Machine Learning Research, 2005, pp. 1453-1484, vol. 6.

Varadarajan, Balakrishnan et al., "Quick FMLLR for Speaker Adaptation in Speech Recognition." IEEE International Conference on Acoustics, Speech and Signal Processing, 2008. ICASSP 2008, Mar. 31-Apr. 4, 2008, pp. 4297-4300.

Velivelli et al., "Automatic Video Annotation by Mining Speech Transcripts," Proceedings of the 2006 Conference on Computer Vision and Pattern Recognition Workshop, 2006, pp. 1-8.

Xu, Haihua et al., "Minimum Bayes Risk Decoding and System Combination Based on a Recursion for Edit Distance." Computer Speech & Language, 2011, pp. 802-828, vol. 25, No. 4.

Zhang, Shilei et al., "Model Dimensionality Selection in Bilinear Transformation for Feature Space MLLR Rapid Speaker Adaptation," 2012 IEEE International Conference on Acoustics, Speech and Signal Processing (ICASSP), Mar. 25-30, 2012, pp. 4353-4356.

Office Action for U.S. Appl. No. 13/653,804 mailed Apr. 2, 2013, 35 pages.

Office Action for U.S. Appl. No. 13/653,792 mailed Mar. 27, 2013, 26 pages.

Office Action for U.S. Appl. No. 13/666,223 mailed Apr. 8, 2013, 7 pages.

Final Office Action for U.S. Appl. No. 13/461,093 mailed Jan. 14, 2013, 25 pages.

"A Brief Introduction to Perceptrons," pp. 1-2, www.cs.utsa.edu/~bylander/cs5233/perceptron.pdf (Accessed Apr. 20, 2012).

Breslin, C. et al., "Prior Information for Rapid Speaker Adaptation," In Proceedings of Interspeech, pp. 1644-1647 (2010).

Collins and Koo, "Discriminative Reranking for Natural Language Parsing," Computational Linguistics, vol. 31, No. 1, pp. 25-70 (Mar. 2005).

Collins, Michael, "Discriminative Reranking for Natural Language Parsing," Proc 17th International Conf on Machine Learning, vol. 31, Issue: 1, Publisher: Morgan Kaufmann, San Francisco, CA, pp. 175-182 (2000).

Ferras, Marc et al., "Constrained MLLR for Speaker Recognition," IEEE International Conference on Acoustics, Speech and Signal Processing (ICASSP 2007), vol. 4, pp. IV-53 to IV-56 (2007).

Gales, M.J.F., "Maximum Likelihood Linear Transformations for HMM-based Speech Recognition," CUED/F-INFENG/TR 291, Tech. Rep., Cambridge University Engineering Department, pp. 1-19 (May 1997).

Glass, James and Zue, Victor, Lecture 7, Pattern Classification, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture7.pdf (Accessed Apr. 20, 2012).

Glass, James and Zue, Victor, Lecture 9, Dynamic Time Warping & Search, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture9.pdf (Accessed Apr. 20, 2012).

Glass, James and Zue, Victor, Lecture 10, Hidden Markov Modelling, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic- speech-recognition-spring-2003/lecture-notes/lecture10.pdf (Accessed Apr. 20, 2012).

Glass, James and Zue, Victor, Lecture 11-12, Language Modelling for Speech Recognition, pp. 1-47, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture1112.pdf (Accessed Apr. 20, 2012).

Glass, James and Zue, Victor, Lecture 13, A Practical Introduction to Graphical Models and their use in ASR, pp. 1-37, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture13.pdf (Accessed Apr. 20, 2012).

Glass, James and Zue, Victor, Guest Lecture 14 by Rita Singh, Part I: Designing HMM-based ASR systems, pp. 1-68, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture14.pdf (Accessed Apr. 20, 2012).

Glass, James and Zue, Victor, Guest Lecture 15 by Rita Singh, Part I: Designing HMM-based ASR systems, Part II: Training continuous density HMMS, pp. 1-66, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture15.pdf (Accessed Apr. 20, 2012).

Glass, James and Zue, Victor, Lecture 17, Finite-State Techniques for Speech Recognition, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture17.pdf (Accessed Apr. 20, 2012).

Glass, James and Zue, Victor, Lecture 18, ASR for Spoken-Dialogue Systems, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture18.pdf (Accessed Apr. 20, 2012).

Goodman, Joshua T., "A Bit of Progress in Language Modeling Extended Version," Computers & Electrical Engineering, vol. 37, Issue 4, pp. 559-569 (Jul. 2011).

Hall et al., "MapReduce/Bigtable for Distributed Optimization," Neural Information Processing Systesm Workshop on Leaning on Cores, Clusters, and Clouds, pp. 1-7 (2010).

Hasegawa-Johnson, Mark, Lecture 2: Acoustic Features, Acoustic Model Training, and Unix Scripting, pp. 1-16 (Jan. 8, 2009).

Leggetter, C.J. et al., "Maximum likelihood linear regression for speaker adaptation of continuous density hidden Markov models," Computer Speech and Language, vol. 9, pp. 171-185 (1995).

Lei et al., "Robust Feature Space Adaptation for Telephony Speech Recognition." In Proc. ICSLP, pp. 773-776 (2006).

Li, Yongxin et al., "Incremental On-Line Feature Space MLLR Adaptation for Telephony Speech Recognition." In International Conference on Spoken Language Processing, Denver, pp. 1417-1420 (2002).

Matsoukas et al., "Improved Speaker Adaptation Using Speaker Dependent Feature Projections," IEEE Workshop on Automatic Speech Recognition and Understanding (ASRU'03), pp. 273-278 (2003).

McDonald et al., "Distributed Training Strategies for the Structure Perceptron," Proceeding HLT '10 Human Language Technologies: The 2010 Annual Conference for the North American Chapter of the Association for Computational Linguistics, pp. 1-9 (2010).

Mohri et al., "Speech Recognition with Weighted Finite-State Transducers," Springer Handbook on Speech Processing and Speech Communication, Part E, Chapter 28, pp. 1-31 (2008).

Mohri, Mehryar, "Weighted Automata Algorithms," Handbook of Weighted Automata. Monographs in Theoretical Computer Science, pp. 213-254, Springer (2009).

Mohri et al., "Weighted Finite-State Transducers in Speech Recognition," Department of Computer & Information Science, Departmental Papers (CIS), University of Pennsylvania, pp. 1-13 (May 14, 2004), www.cs.nyu.edu/~mohri/pub/csl01.pdf.

(56) References Cited

OTHER PUBLICATIONS

Rabiner et al., "Introduction to Digital Speech Processing," Foundations and Trends in Signal Processing, vol. 1, Nos. 1-2, pp. 1-194 (2007).

Reynolds, Douglas, "Gaussian mixture models." Encyclopedia of Biometric Recognition, pp. 12-17 (2008).

Reynolds et al., "Speaker Verification Using Adapted Gaussian Mixture Models," Digital Signal Processing, vol. 10, pp. 19-41 (2000).

Reynolds et al., "Robust Text-Independent Speaker Identification Using Gaussian Mixture Speaker Models," IEEE Transactions on Speech and Audio Processing, vol. 3, No. 1, pp. 72-83 (Jan. 1995).

Roark et al., "Discriminative n-gram language modeling," Computer Speech and Language, vol. 21, pp. 373-392 (2007).

Roark et al., "Discriminative Language Modeling with Conditional Random Fields and the Perceptron Algorithm," ACL'04 Proceedings of the 42nd Annual Meeting on Association for Computational Linguistics, pp. 1-8 (2004).

Rosell, Magnus "An Introduction to Front-End Processing and Acoustic Features for Automatic Speech Recognition," pp. 1-10 (Jan. 17, 2006) Swedish national graduate school of language technology "GSLT". www.csc.kth.se/~rosell/courses/rosell_acoustic_features.pdf.

Saon, George, et al., "Eliminating Inter-Speaker Variability Prior to Discriminant Transforms." IEEE Workshop on Automatic Speech Recognition and Understanding (ASRU'01) pp. 73-76 (2001).

Saon, George, et al., "Linear feature space projections for speaker adaptation." 2001 IEEE International Conference on Acoustics, Speech, and Signal Processing (ICASSP'01) vol. 1, pp. 325-328, (2001).

Saraclar et al, "Joint Discriminative Language Modeling and Utterance Classification," IEEE International Conference on Acoustics, Speech and Signal Processing (ICASSP'05) vol. 1, pp. 561-564 (2005).

Tran, Dat et al., "Fuzzy Gaussian Mixture Models for Speaker Recognition," In Proceedings of the International Conference on Spoken Language Processing, pp. 759-762 (1998).

Woodland, Phil C. "Speaker Adaptation for Continuous Density HMMs: A Review." In ISCA Tutorial and Research Workshop (ITRW) on Adaptation Methods for Speech Recognition, pp. 11-19 (Aug. 29-30, 2001).

Notice of Allowance for U.S. Appl. No. 13/456,671 mailed Oct. 9, 2012, 8 pages.

Office Action for U.S. Appl. No. 13/461,093 mailed Aug. 2, 2012, 18 pages.

Office Action for U.S. Appl. No. 13/456,671 mailed Jun. 13, 2012, 16 pages.

\* cited by examiner

LOCALIZED SPEECH RECOGNITION WITH OFFLOAD

CROSS-REFERENCE TO RELATED APPLICATION

The present application claims priority to U.S. patent application No. 61/671,310, filed on Jul. 13, 2012 and herein incorporated by reference in its entirety.

BACKGROUND

Automatic speech recognition (ASR) technology can be used to map audio utterances to textual representations of those utterances. In some systems, ASR involves dynamically adapting acoustic model parameters based on features of a particular speaker's utterances to potentially improve speech recognition performance for the particular speaker. However, these adaptations may be device-specific, and the particular speaker may provide utterances to multiple devices.

SUMMARY

In a first example embodiment, an utterance may be received from a user device. In response to receiving the utterance, a text string transcription of the utterance may be obtained, and a response mode for the utterance may be determined. If the response mode is a text-based mode, the text string transcription may be provided to a target device. If the response mode is a non-text-based mode, the text string transcription may be converted into one or more commands from a command set supported by the target device, and the one or more commands may be provided to the target device.

In a second example embodiment, a computing device may receive a first utterance from a first user device. In response to receiving the first utterance, a first text string transcription of the first utterance may be obtained. It may be determined that the first user device seeks a textual representation of the first utterance. In response to determining that the first user device seeks the textual representation of the first utterance, the first text string transcription may be transmitted to the first user device. The computing device may receive a second utterance from a second user device. In response to receiving the second utterance, a second text string transcription of the second utterance may be obtained. It may be determined that the second user device seeks a command-based representation of the second utterance. In response to determining that the second user device seeks the command-based representation of the second utterance, the second text string transcription may be converted into one or more commands in a command set supported by the second user device, and the one or more commands may be transmitted to the second user device.

A third example embodiment may include a non-transitory computer-readable storage medium, having stored thereon program instructions that, upon execution by a computing device, cause the computing device to perform operations in accordance with the first and/or second example embodiments.

A fourth example embodiment may include a computing device, comprising at least a processor and data storage. The data storage may contain program instructions that, upon execution by the processor, operate in accordance with the first and/or second example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
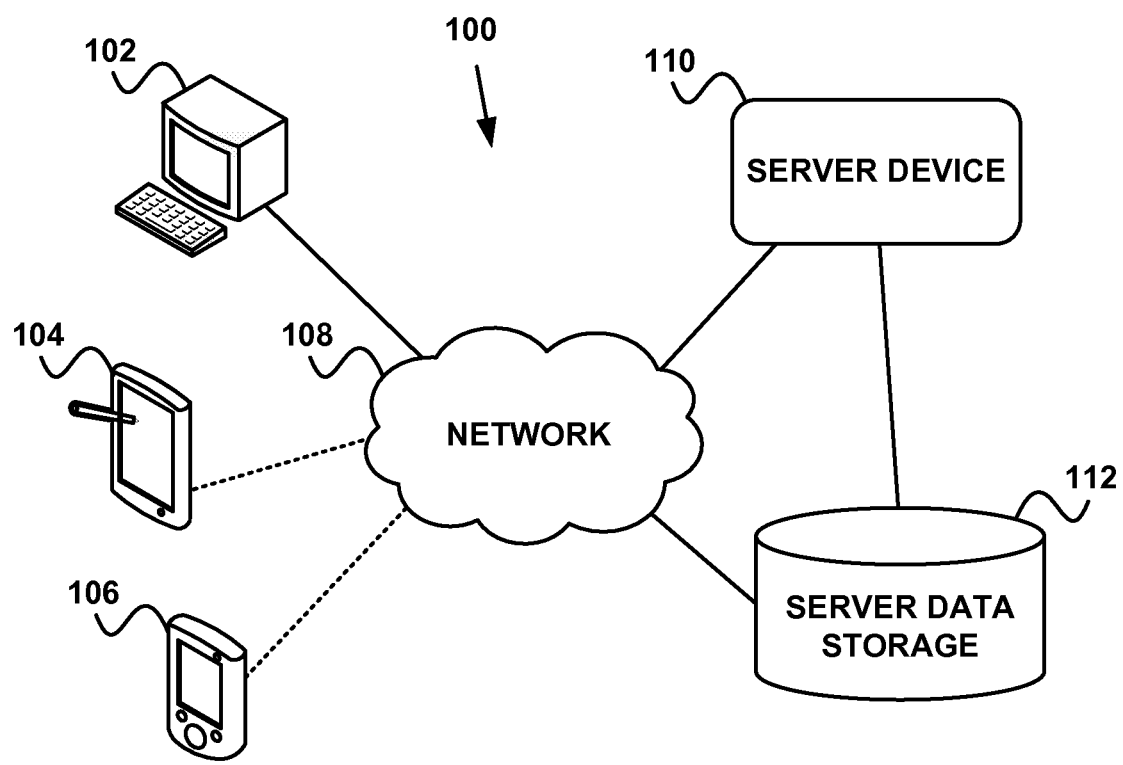
FIG. 1 depicts a distributed computing architecture, in accordance with an example embodiment.

As computing power continues to increase, ASR systems and devices may be deployed in various environments to provide speech-based user interfaces. Some of these environments include residences, businesses, and vehicles, just to name a few.

In residences and businesses, ASR may provide voice control over devices, such as large appliances, (e.g., ovens, refrigerators, dishwashers, washers and dryers), small appliances (e.g., toasters, thermostats, coffee makers, microwave ovens), and media devices (stereos, televisions, digital video recorders, digital video players), as well as doors, lights, curtains, and so on. In vehicles, ASR may provide hands-free use of communication technologies (e.g., cellular phones), media devices (e.g., radios and video players), mapping technologies (e.g., navigation systems), environmental control (e.g., heating and air conditioning), and so on. However, the potential uses for voice control are many and these examples should not be viewed as limiting.

One possible method of providing ASR is to perform speech recognition on the device that receives the utterances from a speaker. For this device-based ASR, each user device may be configured with an ASR module. However, these ASR modules may be quite complex, requiring significant computational resources (e.g., processor power and memory). Therefore, it may be impractical to include an ASR module on some types of user devices, especially relatively simple devices, such as thermostats and remote controls.

Another possible method of providing ASR is to perform speech recognition on a remote network server (e.g., a server or cluster of servers on the Internet). While this method does not require incorporating ASR into user devices, the user devices would still need a communication path with the remote ASR system (e.g., Internet access), and each user device might have to be configured with credentials to that it can access an account on the remote ASR system.

An alternative method of providing ASR in various environments is through deployment and use of a local ASR system that offloads the performance of at least some aspects of ASR from devices subject to voice control. The local ASR system may be a dedicated device or devices performing ASR, or software configured to operate, for instance, on a general purpose computing platform. This local ASR system may be physically located in a residence, business, vehicle, etc., and may operate even if the user devices do not have Internet access.

Thus, in some embodiments, a user device may receive an utterance from a speaker, and transmit a representation of the utterance to the local ASR system. The local ASR system may transcribe the representation of the utterance into a textual representation of the utterance, and transmit this textual representation to a target device. In some cases, the target device may be the user device or may include the user device. In other cases, the target device may be distinct from the user device.

Alternatively, the local ASR system may instead transmit a command based on a transcription of the utterance to the target device. This command may be based on a transcribed textual representation of the utterance, or may be derived more directly from the representation of the utterance. The command may also be of a command set or command language supported by the target device.

This allows the local ASR system to support applications and devices that use ASR for transcribing utterances to text (e.g., word processing, messaging and other types of applications operating on a wireless communication device, tablet computer, or personal computer), as well as simpler, more traditional applications and devices for which built-in ASR support may be unavailable.

As an example, consider a thermostat. Even programmable thermostats may be relatively simple devices that support a limited command set or command language. It may be too expensive (and unnecessary) to build support for a full ASR system into a thermostat. Thus, based on the embodiments herein, voice control of a thermostat may be supported by providing communication between the thermostat and a local ASR system. For instance, the thermostat may support Wifi, BLUETOOTH®, or various other wireless or wireline technologies. The thermostat may transmit an utterance to the local ASR system, and the local ASR system may convert the utterance into one or more commands from the thermostat's command set or command language. Then, the local ASR system may transmit the command(s) to the thermostat, and the thermostat may execute the command(s).

In an alternative embodiment, a device different from the thermostat may receive the utterance. For instance, a user may provide the utterance to a wireless communication device (such as a smart phone), and the wireless communication device may transmit the utterance, along with an identifier of the thermostat, to the local ASR system. The local ASR system may convert the utterance into one or more commands from the thermostat's command set or command language. Then, the local ASR system may transmit the command(s) to the thermostat, and the thermostat may execute the command(s).

Thus, the local ASR system may perform speech recognition functions for user devices that have communication capabilities, but do not have built-in speech recognition capability. Each user device or type of user device may support a different command set or command language, and the local ASR system may support mapping utterances and/or transcribed text strings into one or more of these command sets or command languages.

The local ASR system may also offload ASR functions from user devices that have built-in speech recognition capabilities (e.g., cell phones, tablet computers, personal computers, etc.) or that are able to communicate with remote ASR systems to engage in speech recognition. Since the local ASR system may be partially or fully dedicated to speech recognition, the local ASR system may have more computational resources to apply to speech recognition than user devices. Consequently, the local ASR system may be able to carry out speech recognition with better performance (e.g., a lower word-error rate) than a user device. Further, the local ASR system may reduce or obviate communications between user devices and the remote ASR system, thereby providing enhanced privacy for the speakers using the user devices.

Nonetheless, if a particular speaker opts-in to remote ASR, the local ASR system may pass the particular speaker's utterances to the remote ASR system. In this case, the remote ASR system may use its possibly more extensive computing resources in order to perform speech recognition with potentially greater performance and accuracy than that of the local ASR system.

Further, the local ASR system may perform speaker adaptation for speakers based on speech received from those speakers on one or more user devices.

Many ASR systems include a speaker independent acoustic model that represents the temporal and/or spectral characteristics of various sub-word sounds (e.g., phonemes) of a hypothetical "average" speaker. However, utterances from different speakers can have different qualities (e.g., different frequencies, tempos, accents, etc.). Thus, when attempting to map aspects of an input utterance to these sub-word sounds, an acoustic model may perform reasonably well for most speakers, but may perform poorly when processing the utterances of some speakers. Particularly, speakers whose voices exhibit temporal and/or spectral characteristics that have not been appropriately represented in the acoustic model may not always be adequately served by an ASR system with a speaker-independent acoustic model.

At a high level, speaker adaptation may involve the ASR system determining (i) the temporal and/or spectral characteristics of a particular speaker's voice, (ii) the difference between these characteristics and associated characteristics of the acoustic model, and (iii) developing a transform that maps the temporal and/or spectral characteristics of the particular speaker's voice to a representation that is closer to that of the acoustic model. This transform may then be applied to subsequent utterances received from the speaker, and the acoustic model may be applied to the result. Developing the transform and applying it to map the speaker's vocal characteristics to an acoustic model can be referred to as feature-space speaker adaptation.

Additionally or alternatively, speaker adaptation may involve adjusting the acoustic model itself based on the characteristics of the particular speaker's voice. For instance, once the ASR system has processed a sufficiently large set of samples of the speaker's utterances using an initial acoustic model, a new acoustic model can be derived, at least in part, from these utterances. The new acoustic model may be used in place of the initial acoustic model. This approach can be referred to as model-space speaker adaptation. Typically, more samples of the speaker's utterances and more computing resources are used to perform model-space speaker adaptation than are used to perform feature-space speaker adaptation Further, the local ASR system may develop and/or have access to speaker adaptation profiles of one or more speakers that frequent the particular location. These speaker adaptation profiles can be applied across multiple user devices. Thus, for instance, a speaker adaptation profile might be developed using a particular speaker's utterances that were made to a thermostat. This profile may later be applied when the particular speaker speaks to a remote control or to a cell phone.

Thus, speaker adaptation for a particular speaker can occur as the speaker uses different devices. Further, when the particular speaker speaks to a new device, or a device to which the particular speaker has never spoken before, the particular speaker's speaker adaptation profile may be rapidly applied.

The above processes, and example embodiments thereof, will be described in detail in Sections 6, and 7. However, in order to further embody possible ASR system implementations, the next four sections describe, respectively, example computing systems and devices that may support ASR systems, an overview of ASR system components and functions, an overview of ASR system operation, and an overview of speaker adaptation.

2. Example Communication System and Device Architecture for Supporting Automatic Speech Recognition The methods, devices, and systems described herein can be implemented using client devices and/or so-called "cloud-based" server devices. Under various aspects of this paradigm, client devices, such as mobile phones, tablet computers, and/or desktop computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may also be referred to as "computing devices." Similarly, the "client devices" described herein also may not necessarily be associated with a client/server architecture, and therefore may be interchangeably referred to as "user devices." In some contexts, "client devices" may also be referred to as "computing devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
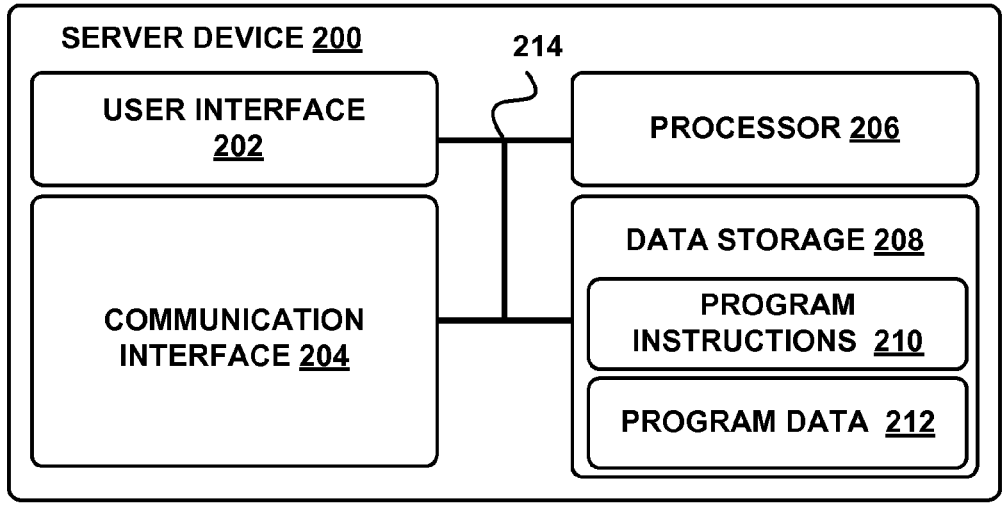
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks.

The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
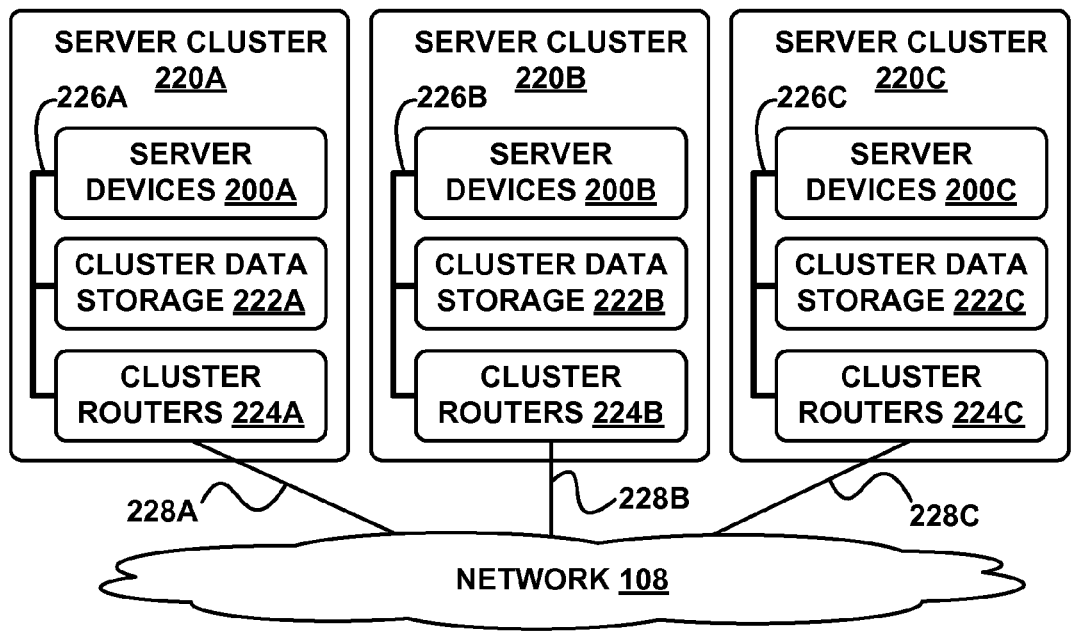
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
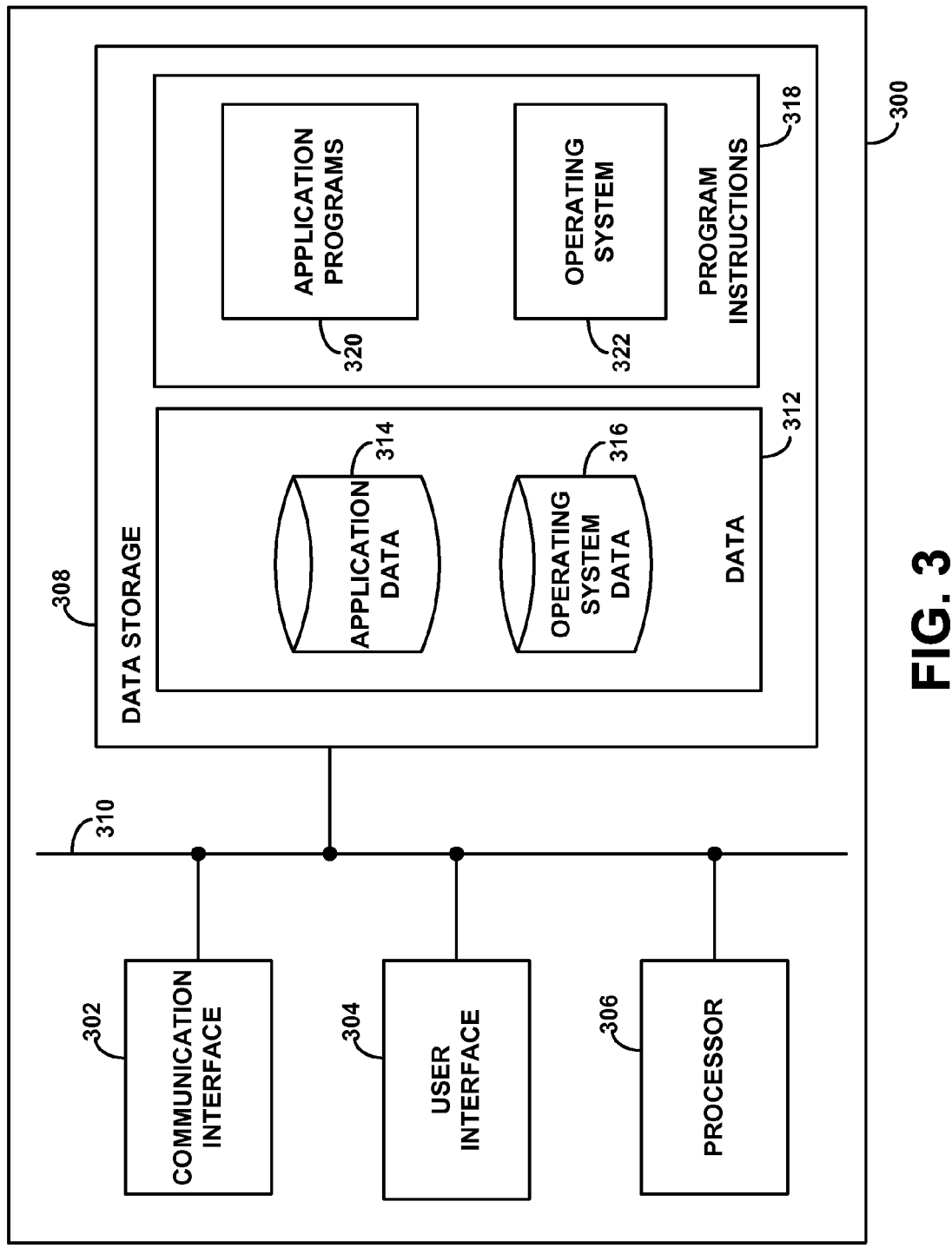
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System Overview

Before describing speaker adaptation in detail, it may be beneficial to understand overall ASR system operation. Thus, this section describes ASR systems in general, including how the components of an ASR system may interact with one another in order to facilitate speech recognition, and how some of these components may be trained.

Figure 4:
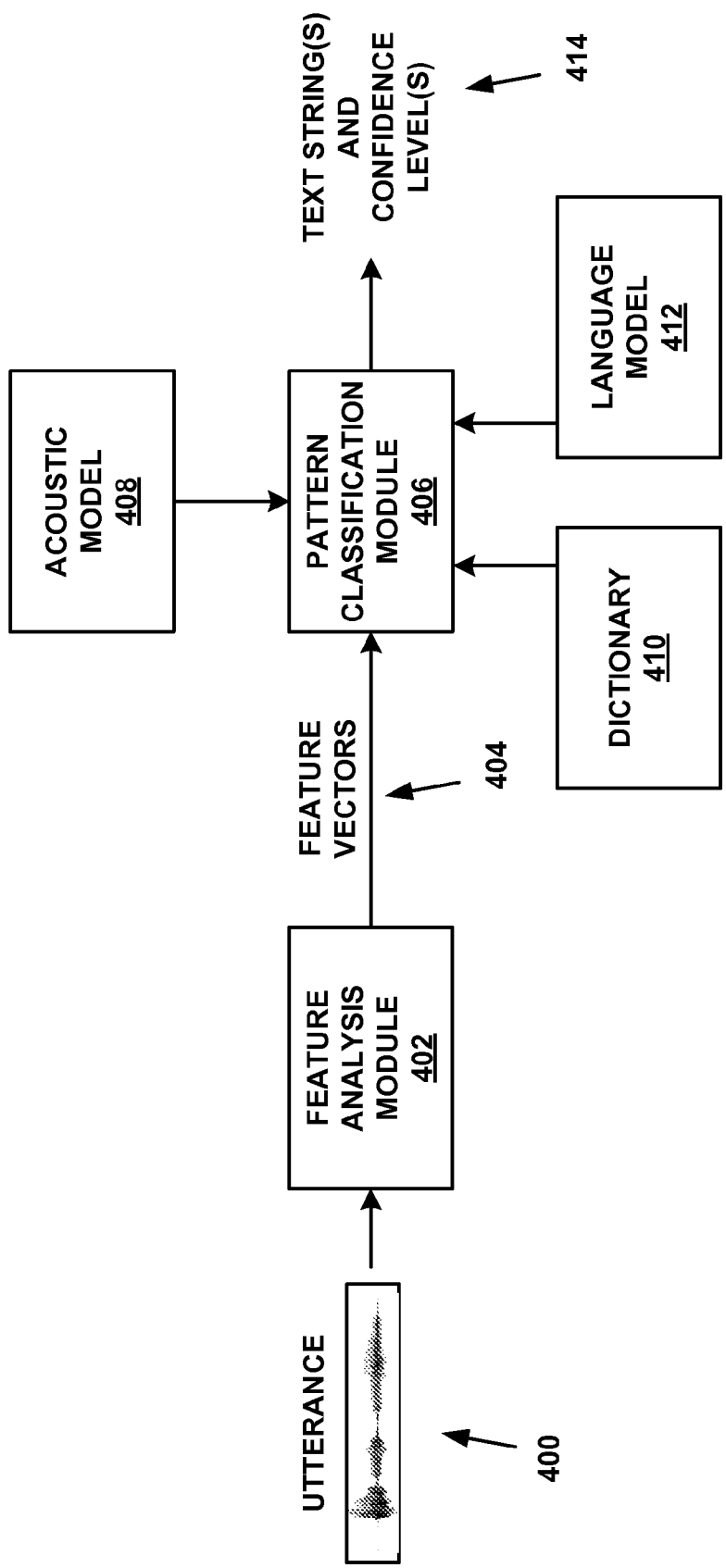
FIG. 4 depicts an ASR system, in accordance with an example embodiment.

FIG. 4 depicts an example ASR system. At run-time, the input to the ASR system may include an utterance 400, and the output may include one or more text strings and possibly associated confidence levels 414. The components of the ASR system may include a feature analysis module 402 that produces feature vectors 404, a pattern classification module 406, an acoustic model 408, a dictionary 410, and a language model 412. Pattern classification module 406 may incorporate various aspects of acoustic model 408, dictionary 410, and language model 412.

It should be noted that the discussion in this section, and the accompanying figures, are presented for purposes of example. Other ASR system arrangements, including different components, different relationships between the components, and/or different processing, may be possible.

A. Feature Analysis Module

Feature analysis module 402 may receive utterance 400. This utterance may include an analog or digital representation of human speech, and may possibly contain background noise as well. Feature analysis module 402 may convert utterance 400 to a sequence of one or more feature vectors 404. Each of feature vectors 404 may include temporal and/or spectral representations of the acoustic features of at least a portion of utterance 400. For instance, a feature vector may include mel-frequency cepstrum coefficients of such a portion.

The mel-frequency cepstrum coefficients may represent the short-term power spectrum of a portion of utterance 400. They may be based on, for example, a linear cosine transform of a log power spectrum on a nonlinear mel scale of frequency. (A mel scale may be a scale of pitches subjectively perceived by listeners to be about equally distant from one another, even though the actual frequencies of these pitches are not equally distant from one another.)

To derive these coefficients, feature analysis module 402 may sample and quantize utterance 400, divide it into overlapping or non-overlapping frames of s milliseconds, and perform spectral analysis on the frames to derive the spectral components of each frame. Feature analysis module 402 may further perform noise removal and convert the standard spectral coefficients to mel-frequency cepstrum coefficients, and then calculate first-order and second-order cepstral derivatives of the mel-frequency cepstrum coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 400 may be represented by a feature vector of mel-frequency cepstrum coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments.

B. Pattern Classification Module

Pattern classification module 406 may receive a sequence of feature vectors 404 from feature analysis module 402 and produce, as output, one or more text string transcriptions 414 of utterance 400. Each transcription 414 may be accompanied by a respective confidence level indicating an estimated likelihood that the transcription is correct (e.g., 80% confidence, 90% confidence, etc.).

To produce this output, pattern classification module 406 may include, or incorporate aspects of acoustic model 408, dictionary 410, and/or language model 412. In some embodiments, pattern classification module 406 may also use a search graph that represents sequences of word or sub-word acoustic features that appear in spoken utterances. The behavior of pattern classification module 406 will be described below in the context of these modules.

C. Acoustic Model

Acoustic model 408 may determine probabilities that a particular sequence of feature vectors 404 were derived from a particular sequence of spoken words and/or sub-word sounds. This may involve mapping sequences of feature vectors to one or more phonemes, and then mapping sequences of phonemes to one or more words.

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is /k/ /ae/ /t/, consisting of the phonemes /k/, /ae/, and /t/. Another example phonemic spelling for the word "dog" is /d/ /aw/ /g/, consisting of the phonemes /d/, /aw/, and /g/.

Different phonemic alphabets exist, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible.

Common phonemic alphabets for American English contain about 40 distinct phonemes. Each of these phonemes may be associated with a different distribution of feature vector values. Thus, acoustic model 408 may be able to estimate the phoneme(s) in a feature vector by comparing the feature vector to the distributions for each of the 40 phonemes, and finding one or more phonemes that are most likely represented by the feature vector.

One way of doing so is through use of a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify the probability of making a transition from the current state to another state.

When applied to an ASR system, the combination of the multivariate Gaussian distribution and the state transitions for each state may define a time sequence of feature vectors over the duration of one or more phonemes. Alternatively or additionally, the HMM may model the sequences of phonemes that define words. Thus, some HMM-based acoustic models may also consider phoneme context when a mapping a sequence of feature vectors to one or more words.

Figure 5:
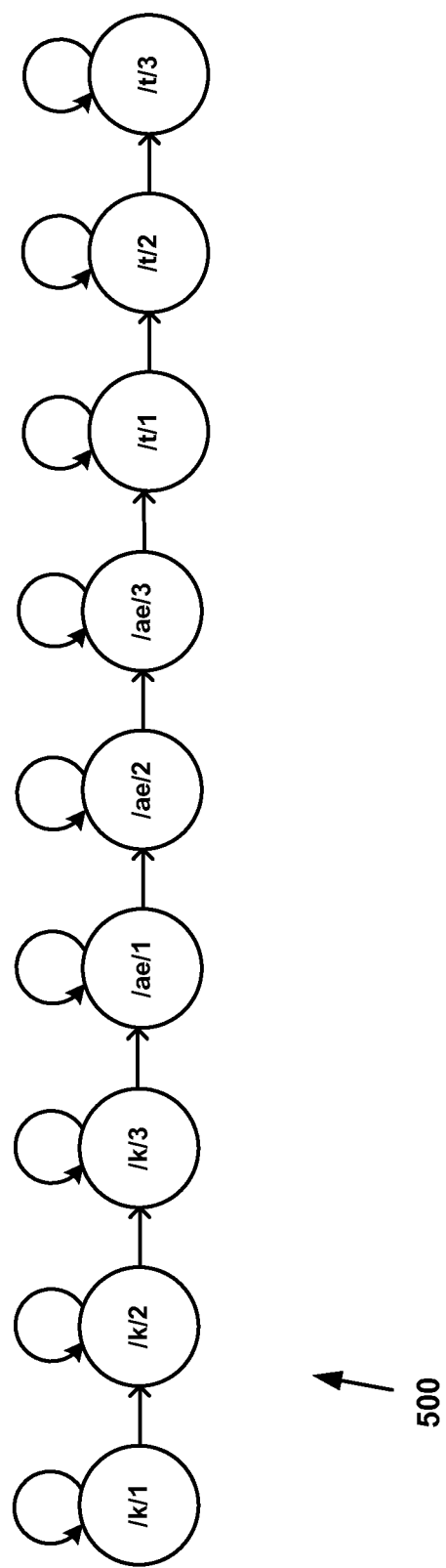
FIG. 5 depicts aspects of an acoustic model, in accordance with an example embodiment.

FIG. 5 depicts an example HMM-based acoustic model 500. Acoustic model 500 defines a sequence of phonemes that make up the word "cat." Thus, each phoneme is represented by a 3-state HMM with an initial state, a middle state, and an end state representing the statistical characteristics at the beginning of phoneme, the middle of the phoneme, and the end of the phoneme, respectively. Each state (e.g., state /k/1, state /k/2, etc.) may represent a phoneme and may include one or more transitions.

Acoustic model 500 may represent a word by concatenating the respective 3-state HMMs for each phoneme in the word together, with appropriate transitions. These concatenations may be performed based on information in dictionary 410, as discussed below. In some implementations, more or fewer states per phoneme may be used in an acoustic model.

An acoustic model may be trained using recordings of each phoneme in numerous contexts (e.g., various words and sentences) so that a representation for each of the phoneme's states can be obtained. These representations may encompass the multivariate Gaussian distributions discussed above.

In order to train the acoustic model, a possibly large number of utterances containing spoken phonemes may each be associated with transcriptions. These utterances may be words, sentences, and so on, and may be obtained from recordings of everyday speech or some other source. The transcriptions may be high-accuracy automatic or manual (human-made) text strings of the utterances.

The utterances may be segmented according to their respective transcriptions. For instance, training of the acoustic models may involve segmenting the spoken strings into units (e.g., using either a Baum-Welch and/or Viterbi alignment method), and then using the segmented utterances to build distributions for each phoneme state.

Consequently, as more data (utterances and their associated transcriptions) are used for training, a more accurate acoustic model is expected to be produced. However, even a well-trained acoustic model may have limited accuracy when used for ASR in a domain for which it was not trained. For instance, if an acoustic model is trained by utterances from a number of speakers of American English, this acoustic model may perform well when used for ASR of American English, but may be less accurate when used for ASR of, e.g., British English.

Also, if an acoustic model is trained using utterances from a number of speakers, it will likely end up representing each phoneme as a statistical average of the pronunciation of this phoneme across all of the speakers. Thus, an acoustic model trained in this fashion may represent the pronunciation and usage of a hypothetical average speaker, rather than any particular speaker.

For purposes of simplicity, throughout this specification and the accompanying drawings, it is assumed that acoustic models represent phonemes as context-dependent phonemic sounds. However, acoustic models that use other types of representations are within the scope of the embodiments herein.

D. Dictionary

TABLE 1

| Word | Phonemic Interpretation |
|---|---|
| cat | /k/ /ae/ /t/ |
| and | /ay/ /n/ /d/ |
| dog | /d/ /aw/ /g/ |

As noted above, dictionary 410 may define a pre-established mapping between phonemes and words. This mapping may include a list of tens or hundreds of thousands of phoneme-pattern-to-word mappings. Thus, in some embodiments, dictionary 410 may include a lookup table, such as Table 1. Table 1 illustrates how dictionary 410 may list the phonemic sequences that pattern classification module 406 uses for the words that the ASR system is attempting to recognize. Therefore, dictionary 410 may be used when developing the phonemic state representations of words that are illustrated by acoustic model 500.

E. Language Model

Language model 412 may assign probabilities to sequences of phonemes or words, based on the likelihood of that sequence of phonemes or words occurring in an input utterance to the ASR system. Thus, for example, language model 412 may define the conditional probability of $w_n$ (the nth word in a phrase transcribed from an utterance), given the values of the pattern of n−1 previous words in the phrase. More formally, language model 412 may define $$P(w_n | w_1, w_2, \ldots, w_{n-1})$$

In general, a language model may operate on n-grams, which, for example, may be sequences of n phonemes or words that are represented in pattern classification module 406. In practice, language models with values of n greater than 5 are rarely used because of their computational complexity, and also because smaller n-grams (e.g., 3-grams, which are also referred to as tri-grams) tend to yield acceptable results. In the example described below, tri-grams are used for purposes of illustration. Nonetheless, any value of n may be may be used with the embodiments herein.

Language models may be trained through analysis of a corpus of text strings. This corpus may contain a large number of words, e.g., hundreds, thousands, millions or more. These words may be derived from utterances spoken by users of an ASR system and/or from written documents. For instance, a language model can be based on the word patterns occurring in human speech, written text (e.g., emails, web pages, reports, academic papers, word processing documents, etc.), and so on.

From such a corpus, tri-gram probabilities can be estimated based on their respective number of appearances in the training corpus. In other words, if $C(w_1, w_2, w_3)$ is the number of occurrences of the word pattern $w_1, w_2, w_3$ in the corpus, then $$P(w_3 | w_1, w_2) \approx \frac{C(w_1, w_2, w_3)}{C(w_1, w_2)}$$

Thus, a language model may be represented as a table of conditional probabilities. Table 2 illustrates a simple example of such a table that could form the basis of language model 406. Particularly, Table 2 contains tri-gram conditional probabilities.

TABLE 2

| Tri-gram Conditional Probabilities |
|---|
| P(dog\|cat,and) = 0.50 |
| P(mouse\|cat,and) = 0.35 |
| P(bird\|cat,and) = 0.14 |
| P(fiddle\|cat,and) = 0.01 |

For the 2-gram prefix "cat and," Table 2 indicates that, based on the observed occurrences in the corpus, 50% of the time the next 1-gram is "dog." Likewise, 35% of the time, the next 1-gram is "mouse," 14% of the time the next 1-gram is "bird," and 1% of the time the next 1-gram is "fiddle." Clearly, in a fully-trained ASR system, the language model would contain many more entries, and these entries would include more than just one 2-gram prefix.

Nonetheless, using the observed frequencies of word patterns from a corpus of speech (and/or from other sources) is not perfect, as some acceptable tri-grams may not appear in the corpus, and may therefore be assigned a probability of zero. Consequently, when given a zero-probability tri-gram at run time, the language model may instead attempt to map this tri-gram to a different tri-gram associated with a non-zero probability.

In order to reduce this likelihood, the language model may be smoothed so that zero-probability tri-grams have small non-zero probabilities, and the probabilities of the tri-grams in the corpus are reduced accordingly. In this way, tri-grams not found in the corpus can still be recognized by the language model.

4. Example Automatic Speech Recognition System Operation

Once acoustic model 408 and language model 412 are appropriately trained, feature analysis model 402 and pattern classification module 406 may be used to perform ASR. Provided with an input utterance, the ASR system can search the space of valid word sequences from the language model to find the word sequence with the maximum likelihood of having been spoken in the utterance. A challenge with doing so is that the size of the search space can be quite large, and therefore performing this search may take an excessive amount computing resources (e.g., processing time and memory utilization). Nonetheless, there are some heuristic techniques that can be used to reduce the complexity of the search, potentially by orders of magnitude.

For instance, a finite state transducer (FST) can be used to compactly represent multiple phoneme patterns that map to a single word. Some words, such as "data," "either," "tomato," and "potato," have multiple pronunciations. The phoneme sequences for these pronunciations can be represented in a single FST per word.

This process of creating efficient phoneme-level FSTs can be carried out for each word in dictionary 410, and the resulting word FSTs can be combined into sentence FSTs using the language model 412. Ultimately, a very large network of states for phonemes, words, and sequences of words can be developed and represented in a compact search graph.

Figure 6:
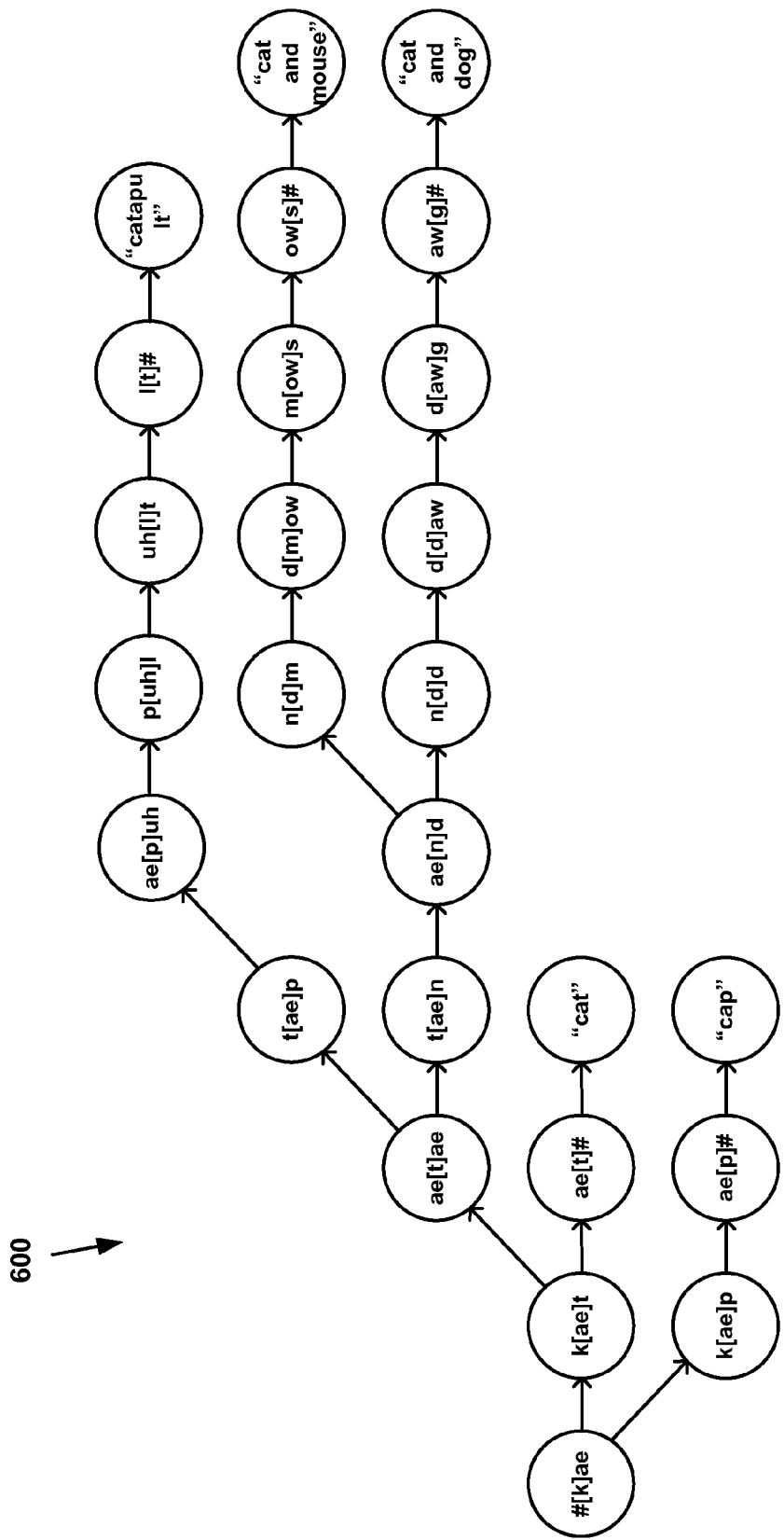
FIG. 6 depicts an ASR system search graph, in accordance with an example embodiment.

FIG. 6 contains an example search graph 600. In order to be illustrative, search graph 600 is much smaller and less complex than a search graph that would be used in an actual ASR system. Particularly, search graph 600 was trained with only the five input utterances, "catapult," "cat and mouse," "cat and dog," "cat," and "cap."

Each circle in search graph 408 may represent a state associated with the processing of an input utterance that has been mapped to phonemes. For purposes of simplicity, each phoneme in search graph 600 is represented with a single state rather than multiple states. Also, self-transitions are omitted from search graph 600 in order to streamline FIG. 6.

The states in search graph 600 are named based on the current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously phoneme in the utterance is x, and the next phoneme in the utterance is z. The beginning of an utterance and the end of an utterance are represented by the "#" character, and also may be referred to as null phonemes.

Terminal states may be represented by a recognized word or phrase in quotes. Search graph 600 includes five terminal states, representing recognition of the words or phrases "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on acoustic model 408, dictionary 410, and language model 412, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

Search graph 600, including any states, transitions between states, and associated costs therein, may be used to estimate text string transcriptions for new input utterances. For example, pattern classification module 406 may determine a sequence of one or more words that match an input utterance based on search graph 600. Formally, pattern classification module 406 may attempt to find $$w^* = \mathrm{argmax}_w P(a|w)P(w)$$

where a is a stream of feature vectors derived from the input utterance, P(a|w) represents the probability of those feature vectors being produced by a word sequence w, and P(w) is the probability assigned to w by language model 412. For example, P(w) may be based on n-gram conditional probabilities as discussed above, as well as other factors. The function $\mathrm{argmax}_w$ may return the value of w that maximizes P(a|w)P(w).

To find text strings that may match utterance 400, pattern classification module 406 may attempt to find paths from an initial state in search graph 600 to a terminal state in search graph 600 based on feature vectors 404. This process may involve pattern classification module 406 performing a breadth-first search, depth-first search, beam search, or some other type of search on search graph 600. Pattern classification module 406 may assign a total cost to one or more paths through search graph 600 based on costs associated with the states and/or transitions of associated with each path. Some of these costs may be based on, for instance, a confidence level that a particular segment of the utterance maps to a particular sequence of phonemes in the path.

As an example, suppose that utterance 400 is the phrase "cat and dog." In a possible scenario, pattern classification module 406 would step through search graph 600 phoneme by phoneme to find the path beginning with initial state "#[k]ae" and ending with terminal state "cat and dog." Pattern classification module 406 may also find one or more additional paths through search graph 600. For example, pattern classification module 406 may also associate utterance 400 with the path with initial state "#[k]ae" and ending with terminal state "cat and mouse," and with the path with initial state "#[k]ae" and ending with terminal state "catapult." Nonetheless, pattern classification module 406 may assign a lower cost to the path with terminal state "cat and dog" than to other paths. Consequently, the path with terminal state "cat and dog" may be selected as the "best" transcription for the input utterance.

It should be understood that ASR systems can operated in many different ways. The embodiments described above are presented for purposes of illustration and may not be the only way in which an ASR system operates.

5. Examples of Speaker Adaptation

As noted above, acoustic models are typically trained with utterances from multiple speakers in multiple environments.

As a result, a given acoustic model may represent a hypothetical average speaker, and might not perform well when applied to utterances from a speaker whose vocal characteristics differ from those of the hypothetical average speaker. Therefore, ASR systems may attempt to compensate for these differences through speaker adaptation.

A. Speaker Adaptation Profiles

Figure 7:
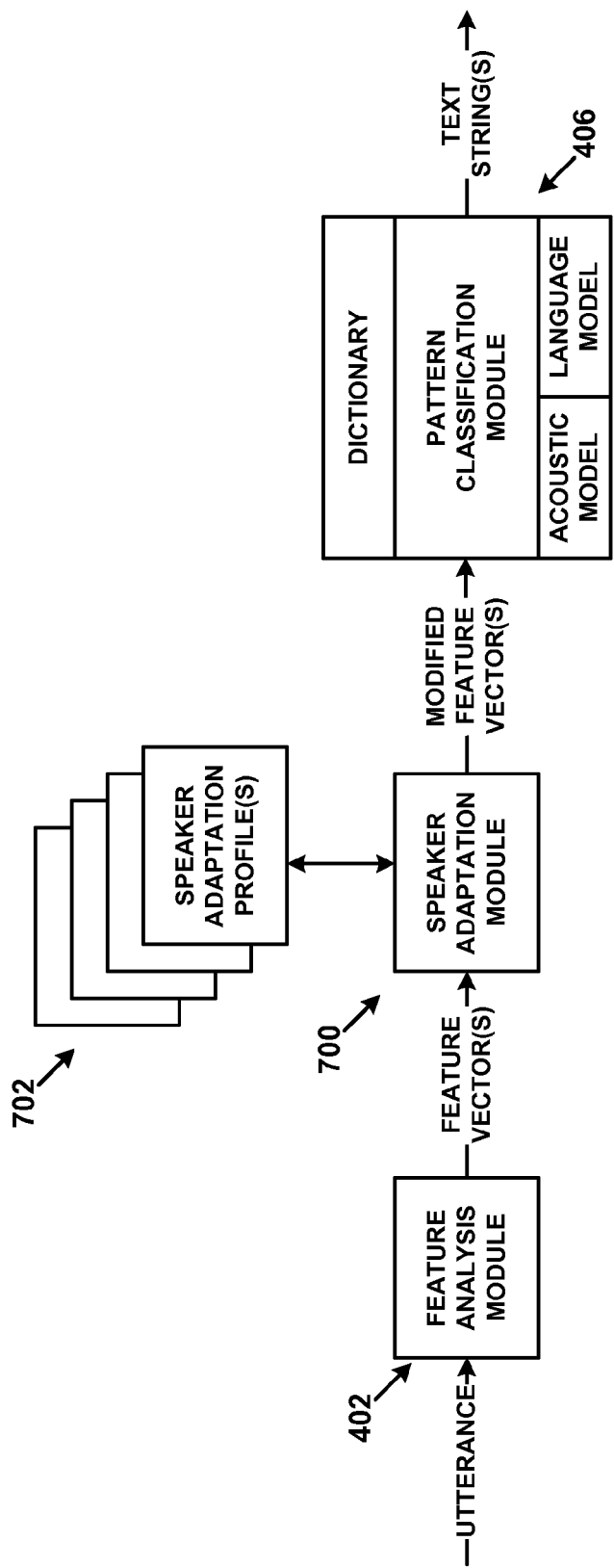
FIG. 7 depicts an ASR system with speaker adaptation, in accordance with an example embodiment.

FIG. 7 depicts an example ASR system with speaker adaptation. Particularly, an utterance is provided as input to feature analysis module 400, which produces one or more feature vectors based on the utterance. These feature vectors may be provided to speaker adaptation module 700, which may modify the feature vectors according to one or more of speaker adaptation profile(s) 702. The modified feature vectors may be provided to pattern classification module 406, which in turn may produce one or more text string transcriptions of the utterance.

Speaker adaptation profiles 702 may include default, gender-specific, and/or speaker-dependent profiles. A default profile may be a profile that the ASR system uses when no other profile has been selected. For instance, when the ASR system begins speech recognition, it may apply the default profile to feature vectors. Additionally, the default profile may be applied to utterances received after the ASR system has been idle for some period of time (e.g., 1-10 minutes or more) or after the ASR system detects that the speaker has changed. In some embodiments, the default profile may not perform any speaker adaptation—in other words, for some default profiles, the modified feature vectors may be the same as the feature vectors.

Speaker-adaptation profiles 702 may also include one or more environment-specific, speaker-dependent profiles. Each of these profiles may be associated with a particular speaker speaking in a particular environment or location. For example, one such profile might be based on the particular speaker speaking in a quiet location, with little background noise. Another such profile might be based on the particular speaker speaking in an environment with a given type of background noise, such as an office or a car. Thus, an environment-specific, speaker-dependent speaker adaptation profile for the speaker may be based on the characteristics of the input utterances, the speaker's location, and/or the user device that receives the utterance.

As noted above, each of the feature vectors may be of a particular length (e.g., n entries), and may include representations of the temporal and/or spectral acoustic features of at least a portion of the utterance. In some embodiments, the speaker adaptation parameters may take the form of a matrix, for instance, an n×n matrix. In order to perform speaker adaptation, speaker adaptation module 700 may multiply each feature vector it receives by the matrix, resulting in updated feature vectors. These updated feature vectors may be transmitted to pattern classification module 406.

The acoustic model used by pattern classification module 406 may be speaker-independent, and speaker adaptation module 700 may use the matrix to adapt speaker-dependent feature vectors so that they are more likely to be properly recognized by the acoustic model. In some cases, the matrix may be a diagonal matrix (i.e., for each entry (if) in the matrix, the entry takes on a non-zero value if i is equal to j, but takes on a value of zero if i is not equal to j). Since at least half of the entries in a 2×2 or greater diagonal matrix contain zeroes, less computation is required to multiply a feature vector by a diagonal matrix than a non-diagonal matrix. (Herein, a non-diagonal matrix refers to a matrix in which at least one entry for which i is not equal to j contains a non-zero value.)

B. Gaussian Mixture Models as Speech Models

From time to time, periodically, and/or on an ongoing basis, the ASR system may compare the characteristics of received utterances to speech models associated with one or more speaker adaptation profiles. Based on the outcome of this comparison, a new speaker adaptation profile may be selected, or the current speaker adaptation profile may continue to be applied.

In some embodiments, the speech models may be represented as Gaussian mixture models (GMMs). A GMM may probabilistically represent the likelihood that a particular speaker is speaking based on feature vectors derived from an input utterance. Formally, a GMM may be a weighted sum of M Gaussian random variables, each with potentially different mean and covariance parameters. An example GMM is given by the equation $$p(x \mid w_i, \mu_i, \Sigma_i) = \sum_{i=1}^{M} w_i g(x \mid \mu_i, \Sigma_i), i = 1 \ldots M$$

where x is an n-dimensional feature vector, $w_i$ are weights such that $$\sum_{i=1}^{M} w_i = 1,$$

and $g(x|\mu_i,\Sigma_i)$ is an n-dimensional Gaussian function with a mean of $\mu_i$ and a covariance matrix of $\Sigma_i$. The speech model for a given profile may be represented as $$\lambda = \{w_i, \mu_i, \Sigma_i\}, i=1 \ldots M$$

GMMs can be used to approximate arbitrarily-shaped probability density functions. Thus, GMMs are powerful tools for representing distributions of feature vectors in ASR systems. In some implementations, full covariance matrices are not used, as partial covariance matrices (e.g., diagonal matrices wherein each non-zero entry represents the variance of a particular component Gaussian function) can provide suitable results.

C. Profile Selection

Assume that the ASR system has access to a set of S speaker adaptation profiles represented by speech models $\lambda_1$, $\lambda_2, \ldots, \lambda_S$, respectively. A goal of speaker adaptation is to select the profile, $\hat{S}$, with a speech model that has the maximum a posteriori probability of being the closest fit for a series of feature vectors. Formally, $$\hat{S} = \mathrm{argmax}_{1 \le k \le S}\, p(\lambda_k \mid X) = \mathrm{argmax}_{1 \le k \le S} \sum_{t=1}^{T} \log p(x_t, \lambda_k)$$

where X is a series of T feature vectors, $x_t$, $1 \le t \le T$. The final equation can be derived from $\mathrm{argmax}_{1 \le k \le S} p(\lambda_k|X)$ through application of Bayes Rule and some simplifying assumptions. Note that $p(x_t|\lambda_k)=p(x_t|w_k,\mu_k,\Sigma_k)$, and thus the solution to this term is provided by the equations in Section 5B.

When selecting a profile, any value of T may be used. For instance, assuming that a feature vector is derived from 10 milliseconds of an input utterance, anywhere from one to several thousand feature vectors may be evaluated according to the equations above, and a profile that fits a majority of the feature vectors may be selected.

D. Speech Model Training

A speech model for a particular speaker adaptation profile (e.g., for speakers of a specific gender, a particular speaker, and/or a particular speaker in a specific environment or location) may be trained based on input utterances. For instance, a female-specific speech model may be trained with utterances from various female speakers in various environments. A speaker-dependent speech model may be trained with utterances from a particular speaker in various environments. An environment-specific, speaker-dependent speech model may be trained with utterances from a particular speaker in a particular environment.

One way of conducting this training is to iteratively calculate a maximum likelihood estimate of a GMM given T observed feature vectors using an expectation-maximization technique. Particularly, this technique provides estimates of the parameters $\lambda=\{w_i,\mu_i,\Sigma_i\}$. Formally, $$\overline{w}_i = \frac{1}{T}\sum_{t=1}^{T} p(i|x_t,\lambda)$$

$$\overline{\mu}_i = \frac{\sum_{t=1}^{T} p(i|x_t,\lambda)x_t}{\sum_{t=1}^{T} p(i|x_t,\lambda)}$$

$$\overline{\sigma}_i^2 = \frac{\sum_{t=1}^{T} p(i|x_t,\lambda)x_i^2}{\sum_{t=1}^{T} p(i|x_t,\lambda)} - \overline{\mu}_i^2$$

where $$p(i|x_t,\lambda) = \frac{w_i g(x_t|\mu_i,\Sigma_i)}{\sum_{k=1}^{M} w_k g(x_t|\mu_k,\Sigma_i)}$$

Note that, for sake of simplicity, these equations only calculate the variances, $\sigma_i^2$, rather than the full covariance matrix, $\Sigma_i$. However, as noted above, these variances can be used to form a diagonal covariance matrix that is sufficient for this example embodiment.

6. Example Embodiments of Localized ASR

Figure 8:
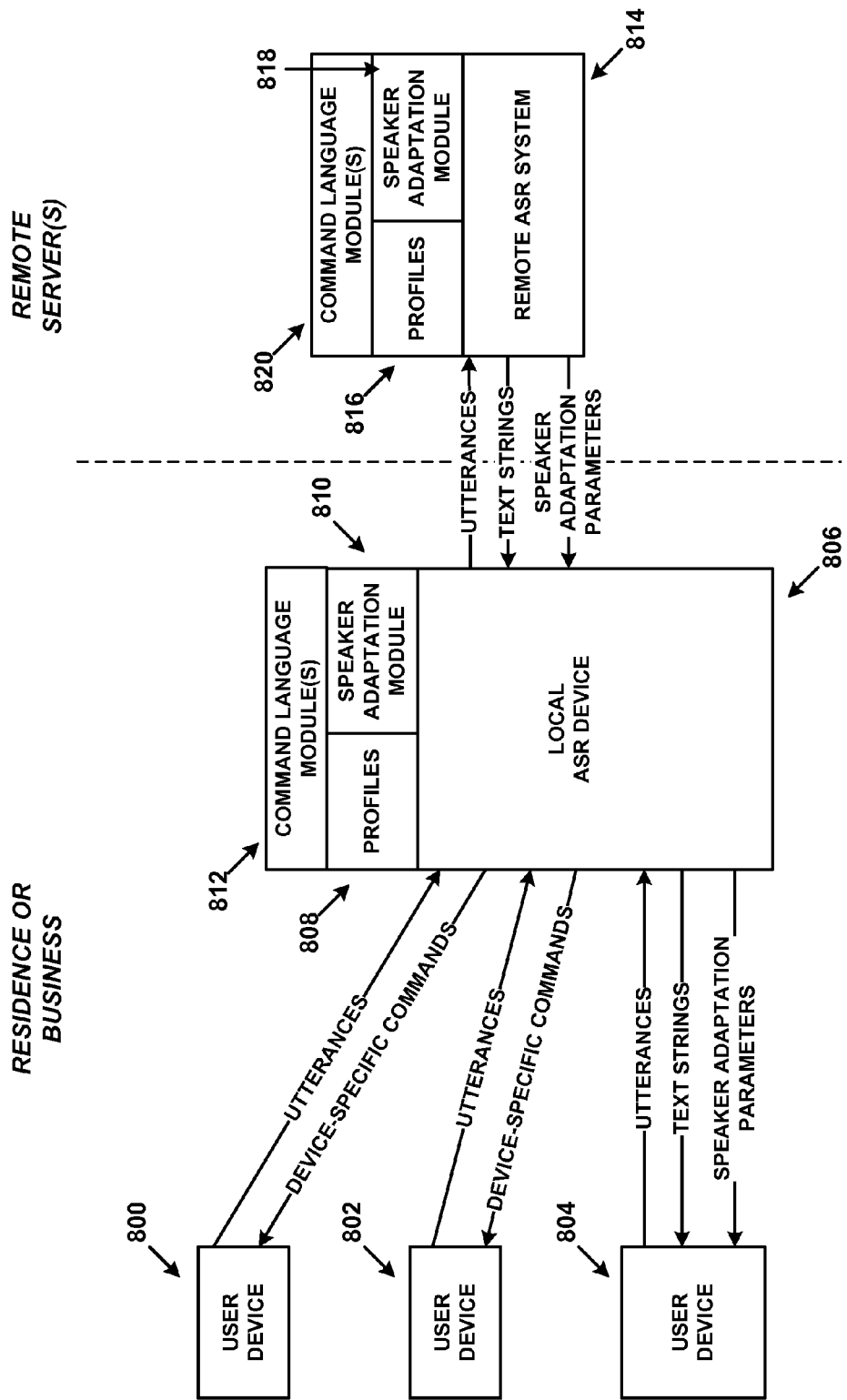
FIG. 8 depicts an architecture that supports local and/or remote ASR, in accordance with an example embodiment.

FIG. 8 depicts an example embodiment of localized ASR with offload capability. User device 800, user device 802, and user device 804 may communicate with local ASR device 806 to facilitate ASR. User devices 800 and 802 may be "thin clients" in the sense that they provide representations of utterances to local ASR device 806 and receive device-specific commands in return. User device 804 may be a wireless communication device (WCD), tablet computer, personal computer, etc., and may be able to provide utterances to local ASR device 806 and receive text string transcriptions of these utterances from local ASR device 806. Further, in some embodiments, user device 804 may support some aspects of ASR (such as feature analysis and speaker adaptation), and may receive speaker adaptation parameters from local ASR device 806.

Local ASR device 806 may include the ASR functions depicted in FIG. 4. Local ASR device 806 may also include profiles 808, speaker adaptation module 810, and/or command language module(s) 812. Local ASR device 806 may be implemented in various form factors, such as a dedicated hardware platform and/or software configured to operate on a personal computer or server, a set-top box, a media gateway, a router, and so on. As indicated in FIG. 8, local ASR device 806 may be located in a residence or business, but local ASR device could operate in other types of locations as well.

Profiles 808 may include profiles and/or accounts for one or more speakers or devices that make use of the services of local ASR device 806. For instance, profiles 808 may include profiles of user devices 800 and 802, indicating that these devices are configured to receive, in response to provided utterances, device-specific commands in respective command languages. Profiles 808 may also contain a profile for user device 804, indicating that user device 804 is configured to receive text string transcriptions of utterances, as well as speaker adaptation parameter updates.

Additionally, profiles 808 may include profiles associated with individual speakers. Among other parameters, these speaker profiles may include indications of the identity of respective speakers, and whether the respective speakers have opted-in to use of a remote ASR system.

Speaker adaptation module 810 may perform speaker adaptation for local ASR device 806. Thus, speaker adaptation module may store or have access to one or more speaker adaptation profiles. These speaker adaptation profiles may contain feature-space and/or model-space speaker adaptation parameters for speakers that have used local ASR device 806. Speaker adaptation module 810 may perform some or all of the functions discussed in reference to FIG. 7.

Command language module(s) 812 may include representations of one or more command sets or command languages used by user devices. Each command set or command language may be used by a different type of user device. For instance, there may be a command language for thermostats, a command language for microwave ovens, and so on. Each command language may define a set of commands, parameters associated with these commands, and/or a grammar for the language.

As a possible example command language, consider a thermostat command language. Suppose that the thermostat has only two functions—heating and cooling. Then, this command language may consist of the following grammar:

set <function><temperature>

The <function> parameter may take on values of either "heating" or "cooling," and the <temperature> parameter may take on integer values in a given range (e.g., 60-90 degrees Fahrenheit). Commands may be represented in various ways, such as textual or binary encodings. Many other command languages are possible.

Thus, local ASR device 806 may be able to receive an utterance from a user device. Possibly based on the information stored in or accessible via profiles 808, speaker adaptation module 810, and/or command language module(s) 812, local ASR device 806 may determine whether to provide a textual transcription or command language representation in response, and then provide the textual transcription or command language representation to the user device. Additionally, when performing the transcription, local ASR device 806 may apply speaker adaptation to the utterance to potentially improve the accuracy of the transcription.

FIG. 8 also includes remote ASR system 814. Remote ASR system 814 may include the ASR functions depicted in FIG. 4, as well as profiles 816, speaker adaptation module 818, and/or command language module(s) 820. Profiles 816, speaker adaptation module 818, and/or command language module(s) 820 may perform similar or the same functions as profiles 808, speaker adaptation module 810, and command language module(s) 812, but may do so on a broader basis.

For example, profiles 816 may include device and/or speaker profiles from more devices and speakers than just those depicted in FIG. 8. For instance, remote ASR system 814 may support thousands or millions of device and/or speakers across a wide range of geographic locations. Additionally, remote ASR system 814 may contain significantly more computing resources (e.g., more processors and more memory) than local ASR device 806.

In some embodiments, local ASR device 806 may provide utterances from one or more of user devices 802, 804, and 806 to remote ASR system 814. Remote ASR system 814 may use its potentially extensive computing resources to transcribe these utterances with potentially more accuracy (e.g., a lower word-error rate) than local ASR device 806. Remote ASR system 814 may provide text string transcriptions of the utterances and/or speaker adaptation parameters to local ASR device 806.

Further, it should be noted that user devices 800, 802, and 804 may communicate with local ASR device 806 via any type of wireless or wireline technologies. In some embodiments, user devices 800, 802, and 804 may use IP to communicate with local ASR device 806. In other embodiments, at least some of these user devices may use non-IP protocols to communicate with local ASR device 806.

Figure 9:
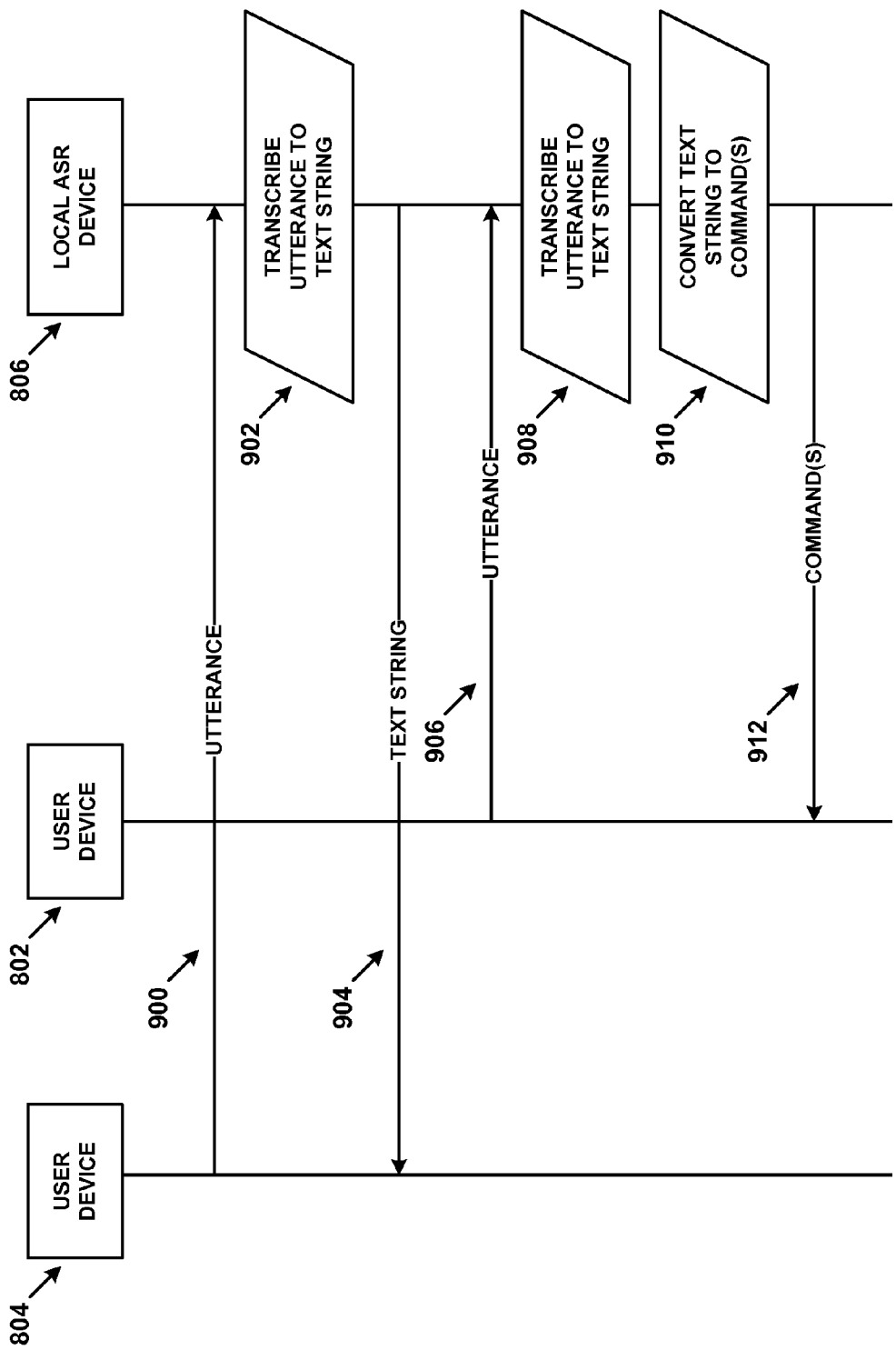
FIG. 9 is a message flow, in accordance with an example embodiment.
Figure 10:
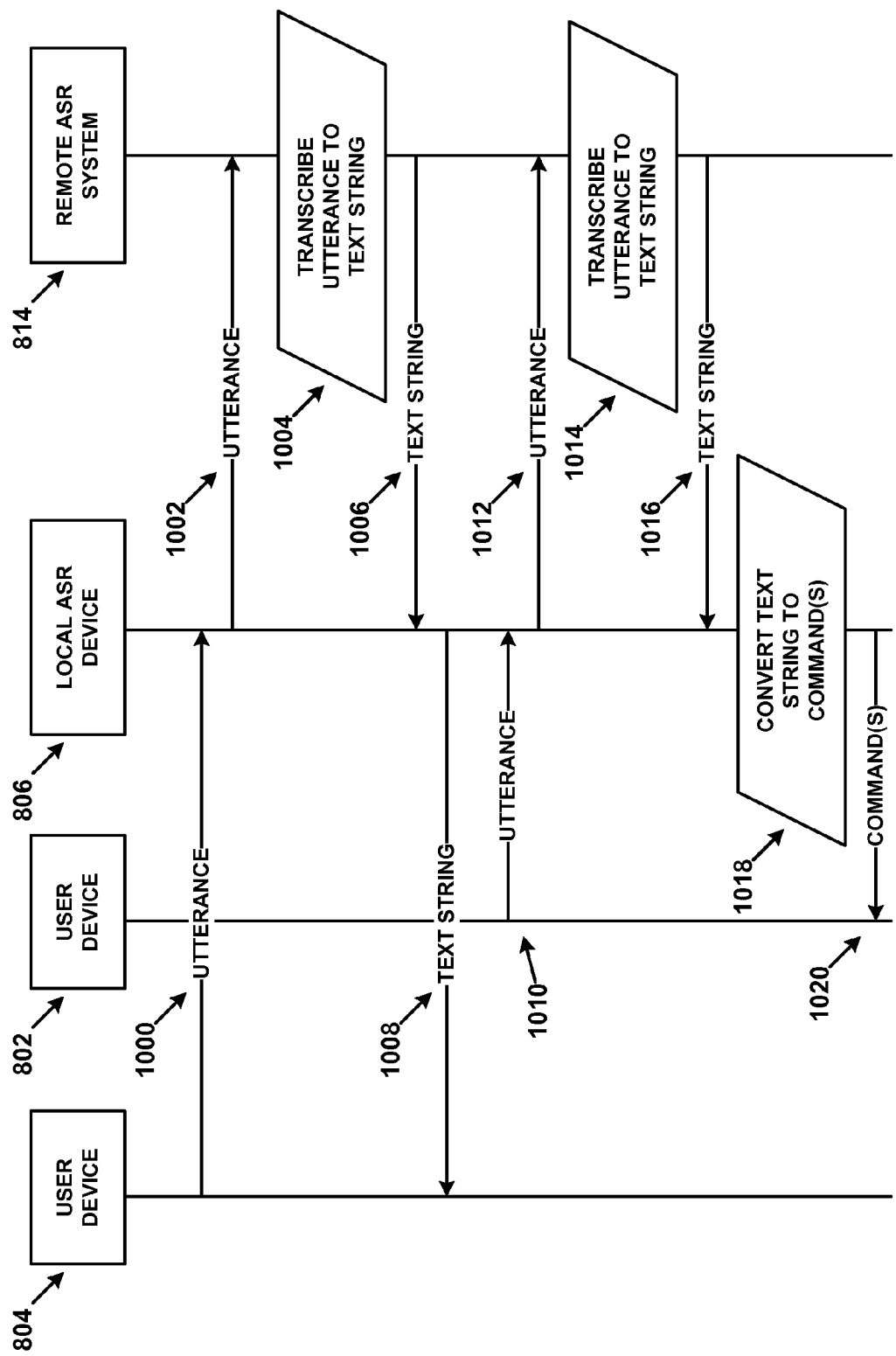
FIG. 10 is another message flow, in accordance with an example embodiment.

FIGS. 9 and 10 illustrate some of the functions of the components of FIG. 8 in more detail. FIG. 9 is a message flow illustrating local ASR device performing ASR on behalf of user device 804 and user device 802.

At step 900, user device 804 provides an utterance to local ASR device 806. At step 902, local ASR device 806 may transcribe the utterance to a text string. Possibly as part of step 902, local ASR device 806 may also determine that user device 804 supports receiving text string transcriptions of utterances.

For instance, local ASR device 806 may query profiles 808 to access a profile of user device 804. This profile may indicate that user device 804 is configured to support a text-based response mode. Alternatively or additionally, the message containing the utterance may indicate that user device 804 is configured to support the text-based response mode. Thus, at step 904, local ASR device 806 may provide the text string to user device 804.

At step 906, user device 802 may provide an utterance to local ASR device 806. At step 908, local ASR device 806 may transcribe the utterance to a text string. Possibly as part of step 908, local ASR device 806 may also determine that user device 802 supports receiving commands in a command set or command language.

For instance, local ASR device 806 may query profiles 808 to access a profile of user device 802. This profile may indicate that user device 802 is configured to support a particular command language. Alternatively or additionally, the message containing the utterance may indicate that user device 802 is configured to support the particular command language. Regardless, at step 910, local ASR device 806 may convert the text string to one or more commands in the particular command language.

In doing so, local ASR device 806 may access command language module(s) 812 to assist or facilitate in the translation of the text string to commands in the command language. For example, command language module 812 may use natural language processing techniques that map words in the text string to one or more commands. Then, at step 912, local ASR device 806 may provide the one or more commands to user device 802. In some embodiments, local ASR device 806 may provide the one or more commands to a target device other than user device 802.

These natural language processing techniques may parse the text string to determine a possible intent of the speaker, and attempt to map this intent to a command or commands. In some cases, multiple text strings may map to the same command. For instance, consider the thermostat command "set heating 70," which instructs a thermostat to set the heating temperature to 70 degrees. The text strings "heat to 70," "heat 70," "raise temperature to 70 degrees," "make it 70 in here," and so on, may all map to this command. Thus, the natural language processing may take into account the various ways that speakers may articulate their intents to a voice-controlled device.

Additionally, local ASR device 806 may perform speaker adaptation when transcribing utterances at steps 902 and 908. For example, if the same speaker produces the utterances of steps 900 and 906, local ASR device 806 may update speaker adaptation parameters for this speaker based on features of the utterance of step 902. Then, these updated speaker adaptation parameters may be applied when transcribing the utterance of step 906. In this way, speaker adaptation may occur across two or more user devices.

Also, local ASR device 806 may provide updated speaker adaptation parameters to the user devices if either of them support ASR or speaker adaptation functions of ASR. Speaker adaptation parameters updates may be provided to a user device at any time, and not just when ASR is being performed on behalf of the user device.

FIG. 10 is a message flow illustrating local ASR device forwarding utterances to remote ASR system 814, and remote ASR system 814 performing ASR on behalf of user device 804 and user device 802.

At step 1000, user device 804 may provide an utterance to local ASR device 806. Local ASR device 806 may determine that user device 804 has opted-in to use of remote ASR system 814. Local ASR device 806 may access profiles 808 to as part of making this determination.

Therefore, at step 1002, local ASR device 806 may provide the utterance to remote ASR system, 814. At step 1004, remote ASR system 814 may transcribe the utterance to a text string. At step 1006, remote ASR system 814 may provide the text string to local ASR device 806.

Possibly as part of step 1008, local ASR device 806 may determine that user device 804 supports receiving text string transcriptions of utterances. For instance, local ASR device 806 may query profiles 808 to access a profile of user device 804. This profile may indicate that user device 804 is configured to support a text-based response mode. Alternatively or additionally, the message containing the utterance that local ASR device 806 received from user device 804 may indicate that user device 804 is configured to support the text-based response mode. Regardless, at step 1008, local ASR device 806 may provide the text string to user device 804.

At step 1010, user device 802 may provide an utterance to local ASR device 806. Local ASR device 806 may determine that user device 802 has opted-in to use of remote ASR system 814. Local ASR device 806 may access profiles 808 to make this determination.

Therefore, at step 1012, local ASR device 806 may provide the utterance to remote ASR system, 814. At step 1014, remote ASR system 814 may transcribe the utterance to a text string. At step 1016, remote ASR system 814 may provide the text string to local ASR device 806.

At step 1018, local ASR device 806 may convert the text string to one or more commands in a command language supported by user device 802. Possibly as part of step 1018, local ASR device 806 may also determine that user device 802 supports receiving commands in a command set or command language.

For instance, local ASR device 806 may query profiles 808 to access a profile of user device 802. This profile may indicate that user device 802 is configured to support a particular command language. Alternatively, the message containing the utterance may indicate that user device 802 is configured to support a particular command language. Regardless, at step 1018, local ASR device 806 may convert the text string to one or more commands in the particular command language.

In doing so, local ASR device 806 may access command language module 812 to assist or facilitate in the translation of the text string to commands in the command language. For example, command language module 812 may use natural language processing techniques that map words in the text string to one or more commands. The techniques discussed in reference to FIG. 9 may be used in this embodiment as well.

Regardless, at step 1020, local ASR device 806 may provide the one or commands to user device 802.

It should be noted that use of the term "providing" herein may indicate that information is being transmitted from one device to another over a network or point-to-point link. However, in some possible embodiments, this term may take on different meanings, and should not be limited to these types of communication. For instance, "providing" may refer to inter-process communication between applications executing on the same device, or communication between hardware modules of the same device.

7. Example Operations

Figure 11:
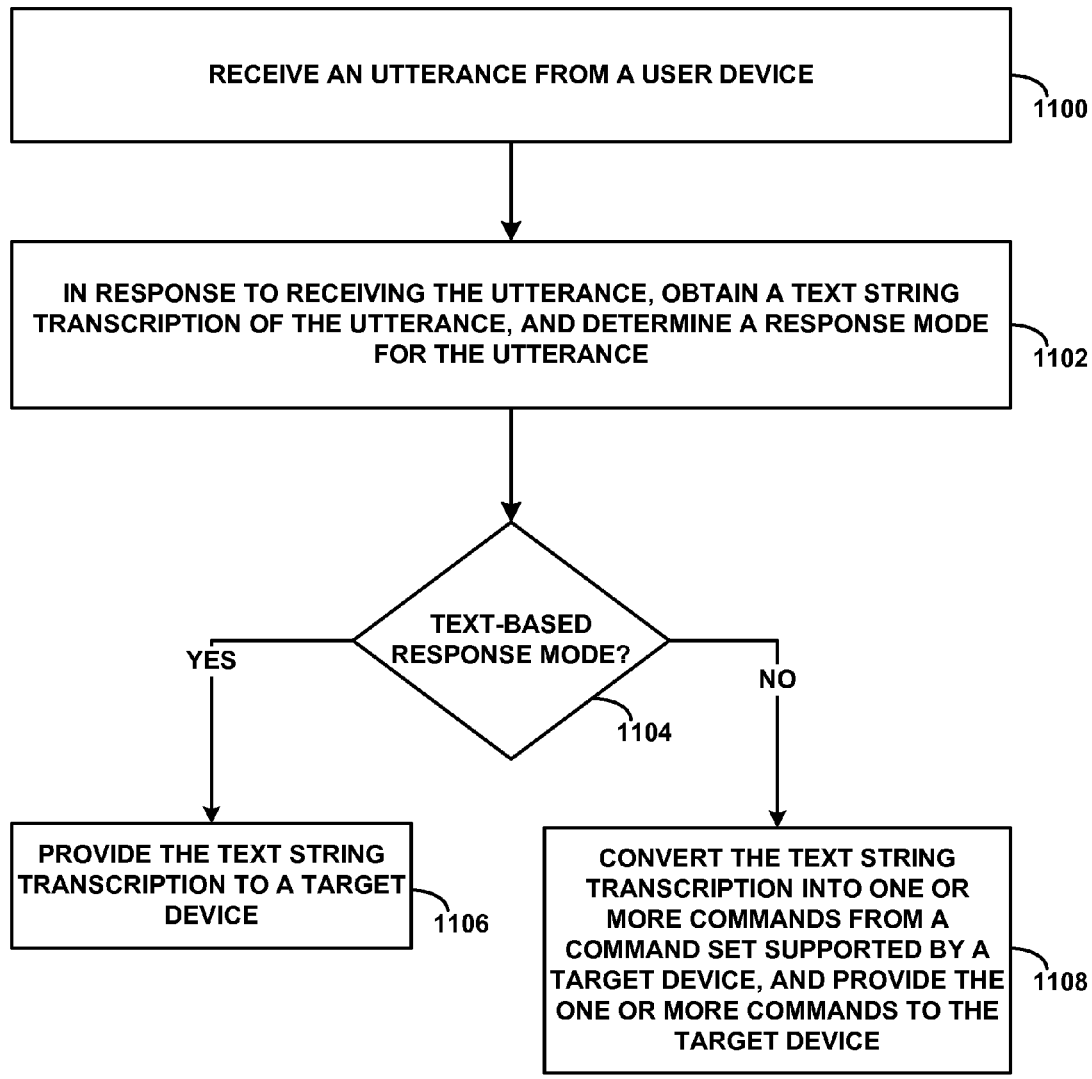
FIG. 11 is a flow chart, in accordance with an example embodiment.

FIG. 11 is a flow chart of an example embodiment. The steps illustrated by this flow chart may be carried out by various computing devices, such as client device 300, server device 200 and/or server cluster 220A. Aspects of some individual steps may be distributed between multiple computing devices.

At step 1100, a local computing device may receive an utterance from a user device. At step 1102, in response to receiving the utterance, a text string transcription of the utterance may be obtained, and a response mode for the utterance may be determined.

Obtaining the text string transcription of the utterance may involve an ASR module of the local computing device transcribing the utterance into the text string transcription. Thus, the text string transcription may include a representation of the utterance. Transcribing the utterance into the text string transcription may involve determining that the utterance matches a speaker adaptation profile, applying speaker adaptation parameters associated with the speaker adaptation profile to the utterance, and updating the speaker adaptation parameters based at least on characteristics of the utterance. The text string transcription may be based on the speaker adaptation parameters.

In some situations, the local computing device may receive a second utterance from the user device. In response to receiving the second utterance, a second text string transcription of the second utterance may be obtained. The second text string transcription may be based on the updated speaker adaptation profile.

Alternatively or additionally, obtaining the text string transcription of the utterance may involve providing the utterance to a remote computing device, and receiving the text string transcription from the remote computing device. The text string transcription may include a representation of the utterance. In some embodiments, the user device and the local computing device may be part of a local network, and the remote computing device might not be part of the local network.

At step 1104, it may be determined whether the response mode is a text-based response mode or a non-text-based response mode. In some scenarios, the non-text-based response mode may be a command-based response mode. Determining the response mode for the utterance may involve looking up a profile of a target device in a database of devices, the database accessible to the local computing device, and based on the profile of the target device, determining the response mode for the utterance. In some cases, the target device may be the user device or may include the user device. In other cases, the target device may be distinct from the user device.

Alternatively or additionally, determining the response mode for the utterance may involve determining the response mode for the utterance from a message sent by the user device, the message containing at least part of the utterance. For example, the message sent by the user device may contain part of the utterance and a field that indicates that the response mode that should be used when responding to the message.

At step 1106, if the response mode is a text-based response mode, the text string transcription may be provided to the target device. At step 1108, if the response mode is a non-text-based response mode, the text string transcription may be converted into one or more commands from a command set supported by the target device, and the one or more commands may be provided to the target device.

Figure 12A:
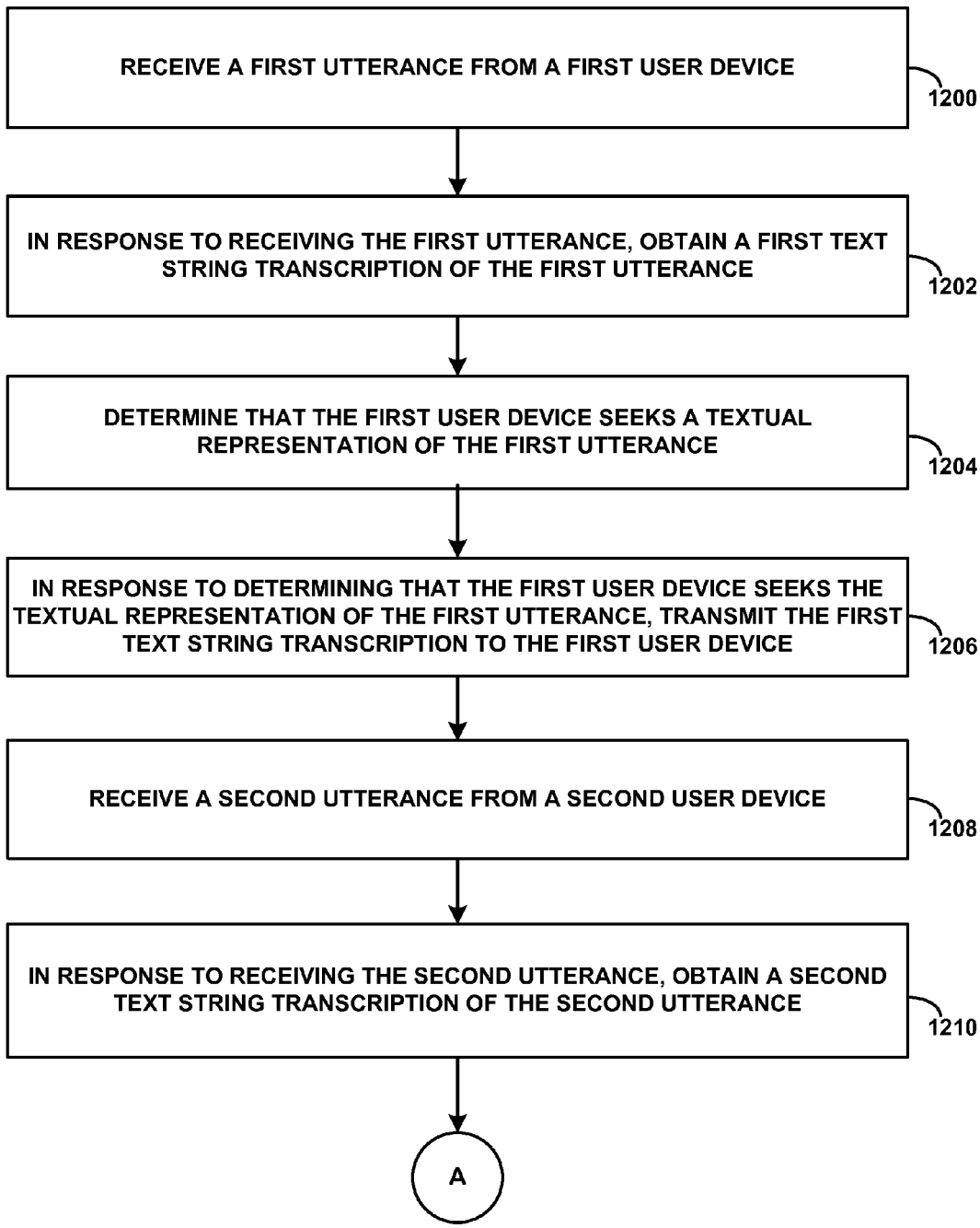
FIGS. 12A and 12B are another flow chart, in accordance with an example embodiment.
Figure 12B:
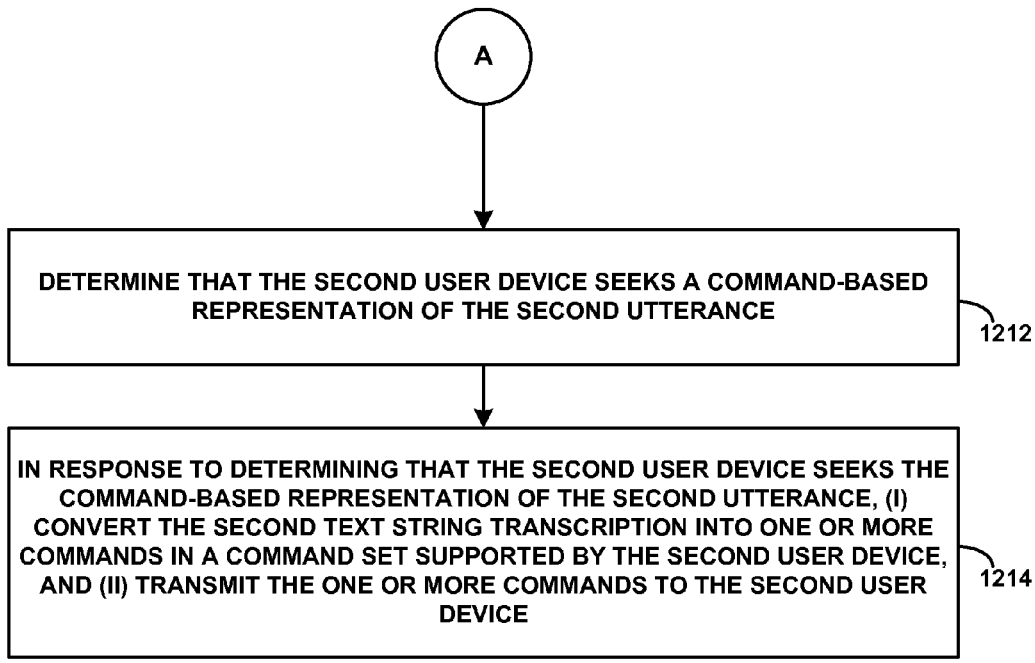

FIGS. 12A and 12B are another flow chart of an example embodiment. Like the example embodiment of FIG. 11, the steps illustrated by this flow chart may be carried out by various computing devices, such as client device 300, server device 200 and/or server cluster 220A, and aspects of some individual steps may be distributed between multiple computing devices.

At step 1200, a local computing device may receive a first utterance from a first user device. At step 1202, in response to receiving the first utterance, a first text string transcription of the first utterance may be obtained.

Obtaining the first text string transcription of the first utterance may involve an ASR module of the local computing device transcribing the first utterance into the first text string transcription. The first text string transcription may include a representation of the first utterance. Transcribing the first utterance into the first text string transcription may involve determining that the first utterance matches a speaker adaptation profile, applying speaker adaptation parameters to the utterance, and updating the speaker adaptation parameters based at least on characteristics of the first utterance. The speaker adaptation parameters may be associated with the speaker adaptation profile, and the first text string transcription may be based on the speaker adaptation parameters.

Alternatively or additionally, obtaining the first text string transcription of the first utterance may involve providing the first utterance to a remote computing device, and receiving the first text string transcription from the remote computing device. The first text string transcription may include a representation of the utterance. In some embodiments, the first user device, the second user device, and the local computing device may be part of a local network, and the remote computing device might not be part of the local network.

At step 1204, it may be determined that the first user device seeks a textual representation of the first utterance. At step 1206, in response to determining that the first user device seeks the textual representation of the first utterance, the first text string transcription may be transmitted to the first user device.

At step 1208, the local computing device may receive a second utterance from a second user device. At step 1210, in response to receiving the second utterance, a second text string transcription of the second utterance may be obtained.

Obtaining the second text string transcription of the second utterance may involve the ASR module of the local computing device transcribing the second utterance into the second text string transcription. The second text string transcription may include a representation of the second utterance. Transcribing the second utterance into the second text string transcription may involve determining that the second utterance matches the speaker adaptation profile, applying the updated speaker adaptation parameters to the second utterance, and further updating the speaker adaptation parameters based at least on characteristics of the second utterance. The second text string transcription may be based on the updated speaker adaptation parameters.

At step 1212, it may be determined that the second user device seeks a command-based representation of the second utterance. At step 1214, in response to determining that the second user device seeks the command-based representation of the second utterance, the second text string transcription may be converted into one or more commands in a command set supported by the second user device, and the one or more commands may be transmitted to the second user device.

In some embodiments, it may be determined that the first user device has speech recognition capability. Based on the first user device having speech recognition capability, the updated speaker adaptation parameters may be provided to the first user device.

8. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

For situations in which the systems discussed here collect personal information about users, the users may be provided with an opportunity to opt in/out of programs or features that may collect personal information (e.g., information about a user's preferences or a user's utterances made to an ASR system). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:

receiving, by a local computing device, an utterance from a user device, wherein the user device and the local computing device are part of a local network;

in response to receiving the utterance, obtaining a text string transcription of the utterance, and selecting a response mode for the utterance from among a text-based response mode and a non-text-based response mode, wherein obtaining the text string transcription of the utterance comprises transcribing the utterance into the text string transcription, wherein the text string transcription includes a representation of the utterance, and wherein transcribing the utterance into the text string transcription comprises (i) determining that the utterance fits a speaker adaptation profile, (ii) applying speaker adaptation parameters to the utterance, wherein the speaker adaptation parameters are associated with the speaker adaptation profile, and wherein the text string transcription is based on the speaker adaptation parameters, and (iii) updating the speaker adaptation parameters based at least on characteristics of the utterance;

if the response mode is a text-based response mode, providing the text string transcription to a target device;

if the response mode is a non-text-based response mode, (i) converting the text string transcription into one or more commands from a command set supported by the target device, and (ii) providing the one or more commands to the target device;

determining that the user device has speech recognition capability and supports speaker adaptation, and based on the user device having speech recognition capability and supporting speaker adaptation, providing the updated speaker adaptation parameters to the user device.

2. The method of claim 1, wherein the target device is the user device.

3. The method of claim 1, further comprising:
receiving, by the local computing device, a second utterance from the user device;
in response to receiving the second utterance, obtaining a second text string transcription of the second utterance, wherein the second text string transcription is based on the updated speaker adaptation profile.

4. The method of claim 1, wherein obtaining the text string transcription of the utterance comprises:
providing the utterance to a remote computing device; and
receiving the text string transcription from the remote computing device, wherein the text string transcription includes a representation of the utterance.

5. The method of claim 4, wherein the remote computing device is not part of the local network.

6. The method of claim 1, wherein the non-text-based response mode is a command-based response mode.

7. The method of claim 1, wherein selecting the response mode for the utterance comprises:
looking up a profile of the target device in a database accessible to the local computing device; and
selecting the response mode for the utterance based of the profile of the target device.

8. The method of claim 1, wherein selecting the response mode for the utterance comprises selecting the response mode for the utterance based on a message sent by the user device, the message containing at least part of the utterance.

9. An article of manufacture including a computer-readable storage medium, having stored thereon program instructions that, upon execution by a local computing device, cause the local computing device to perform operations comprising:
receiving an utterance from a user device, wherein the user device and the local computing device are part of a local network;
in response to receiving the utterance, obtaining a text string transcription of the utterance, and selecting a response mode for the utterance from among a text-based response mode and a non-text-based response mode, wherein obtaining the text string transcription of the utterance comprises transcribing the utterance into the text string transcription, wherein the text string transcription includes a representation of the utterance, and wherein transcribing the utterance into the text string transcription comprises (i) determining that the utterance fits a speaker adaptation profile, (ii) applying speaker adaptation parameters to the utterance, wherein the speaker adaptation parameters are associated with the speaker adaptation profile, and wherein the text string transcription is based on the speaker adaptation parameters, and (iii) updating the speaker adaptation parameters based at least on characteristics of the utterance;

if the response mode is a text-based response mode, providing the text string transcription to a target device;

if the response mode is a non-text-based response mode, (i) converting the text string transcription into one or more commands from a command set supported by the target device, and (ii) providing the one or more commands to the target device;

determining that the user device has speech recognition capability and supports speaker adaptation, and based on the user device having speech recognition capability and supporting speaker adaptation, providing the updated speaker adaptation parameters to the user device.

10. The article of manufacture of claim 9, wherein obtaining the text string transcription of the utterance comprises:
providing the utterance to a remote computing device; and
receiving the text string transcription from the remote computing device, wherein the text string transcription includes a representation of the utterance.

11. A method comprising:
receiving, by a local computing device, a first utterance from a first user device;
in response to receiving the first utterance, obtaining a first text string transcription of the first utterance, wherein obtaining the first text string transcription of the first utterance comprises transcribing, by an automatic speech recognition (ASR) module of the local computing device, the first utterance into the first text string transcription, wherein the first text string transcription includes a representation of the first utterance, and wherein transcribing the first utterance into the first text string transcription comprises (i) determining that the first utterance fits a speaker adaptation profile, (ii) applying speaker adaptation parameters to the utterance, wherein the speaker adaptation parameters are associated with the speaker adaptation profile, and wherein the first text string transcription is based on the speaker adaptation parameters, and (iii) updating the speaker adaptation parameters based at least on characteristics of the first utterance;

determining that the first user device seeks a textual representation of the first utterance;

in response to determining that the first user device seeks the textual representation of the first utterance, transmitting the first text string transcription to the first user device;

determining that the first user device has speech recognition capability and supports speaker adaptation;

based on the first user device having speech recognition capability and supporting speaker adaptation, providing the updated speaker adaptation parameters to the first user device;

receiving, by the local computing device, a second utterance from a second user device, wherein the first user device, the second user device, and the local computing device are part of a local network;

in response to receiving the second utterance, obtaining a second text string transcription of the second utterance;

determining that the second user device seeks a command-based representation of the second utterance; and in response to determining that the second user device seeks the command-based representation of the second utterance, (i) converting the second text string transcription into one or more commands in a command set supported by the second user device, and (iii) transmitting the one or more commands to the second user device.

12. The method of claim 11, wherein obtaining the second text string transcription of the second utterance comprises transcribing, by the ASR module of the local computing device, the second utterance into the second text string transcription, wherein the second text string transcription includes a representation of the second utterance, and wherein transcribing the second utterance into the second text string transcription comprises:

determining that the second utterance fits the speaker adaptation profile;

applying the updated speaker adaptation parameters to the second utterance, wherein the second text string transcription is based on the updated speaker adaptation parameters; and further updating the speaker adaptation parameters based at least on characteristics of the second utterance.

13. The method of claim 11, wherein obtaining the first text string transcription of the first utterance comprises:

providing the first utterance to a remote computing device; and receiving the first text string transcription from the remote computing device, wherein the first text string transcription includes a representation of the utterance.

14. The method of claim 13, wherein the remote computing device is not part of the local network.

\* \* \* \* \*